US012776262B2

(12) United States Patent
Ueno et al.

(10) Patent No.: US 12,776,262 B2
(45) Date of Patent: Oct. 27, 2026

(54) DISPLAY DEVICE

(71) Applicant: SHARP KABUSHIKI KAISHA, Sakai City (JP)

(72) Inventors: Masafumi Ueno, Sakai City (JP); Masaaki Moriya, Sakai City (JP); Naoki Shiobara, Sakai City (JP); Masafumi Kawai, Sakai City (JP); Mohammad Reza Kazemi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 329 days.

(21) Appl. No.: 18/715,533

(22) PCT Filed: Jan. 6, 2022

(86) PCT No.: PCT/JP2022/000150
§ 371 (c)(1),
(2) Date: May 31, 2024

(87) PCT Pub. No.: WO2023/132019
PCT Pub. Date: Jul. 13, 2023

(65) Prior Publication Data
US 2026/0260604 A1 Sep. 3, 2026

(51) Int. Cl.
*G09G 3/3225* (2016.01)

(52) U.S. Cl.
CPC ... *G09G 3/3225* (2013.01); *G09G 2300/0842* (2013.01); *G09G 2320/041* (2013.01); *G09G 2320/045* (2013.01)

(58) Field of Classification Search
CPC ................................................ G09G 2320/043
See application file for complete search history.

(56) References Cited

U.S. PATENT DOCUMENTS 12,315,440 B2 * 5/2025 Kazemi .................. G09G 3/006
2007/0008251 A1 * 1/2007 Kohno ................. G09G 3/3233
345/76

(Continued)

FOREIGN PATENT DOCUMENTS

JP 2007-018876 A 1/2007
JP 2014-517346 A 7/2014

*Primary Examiner* — Sepehr Azari
(74) *Attorney, Agent, or Firm* — ScienBiziP, P.C.

(57) ABSTRACT

A display device includes a display panel including a plurality of pixels, a focused monitoring region setting unit configured to set a focused monitoring region including a group of pixels to be subjected to deterioration monitoring, the deterioration monitoring being configured to measure a decrease amount of a current-voltage characteristic among the plurality of pixels, and a deterioration monitoring control unit configured to perform the deterioration monitoring on the group of pixels included in the focused monitoring region. The focused monitoring region setting unit performs high-speed monitoring to be performed at a higher speed than a speed of the deterioration monitoring, thus obtains a high-speed monitoring measurement value indicating the decrease amount of the current-voltage characteristic of each of the plurality of pixels, and sets a pixel group having the high-speed monitoring measurement value out of an allowable range as the group of pixels to be subjected to the deterioration monitoring.

12 Claims, 21 Drawing Sheets

(56) References Cited

U.S. PATENT DOCUMENTS

| | | | | |
|---|---|---|---|---|
| 2012/0299973 | A1 | 11/2012 | Jaffari et al. | |
| 2016/0379563 | A1 | 12/2016 | Jaffari et al. | |
| 2017/0193873 | A1 | 7/2017 | Jaffari et al. | |
| 2018/0075798 | A1* | 3/2018 | Nho | G09G 3/32 |
| 2018/0240385 | A1 | 8/2018 | Jaffari et al. | |
| 2020/0184887 | A1* | 6/2020 | Nien | G09G 3/3225 |
| 2020/0372861 | A1* | 11/2020 | Ok | G09G 3/3233 |
| 2023/0368737 | A1* | 11/2023 | Jun | G06F 3/011 |
| 2024/0355271 | A1* | 10/2024 | Furukawa | G09G 3/20 |

* cited by examiner

PL

| | FOCUSED MONITORING REGION | | | |
|---|---|---|---|---|
| PREDETERMINED CONDITIONS | FAR10 | FAR20 | FAR30 | FAR40 |
| (1) NUMBER OF PIXELS | | | | |
| (2) MAXIMUM VALUE OF HIGH-SPEED MONITORING CURRENT VALUE | | | | |
| (3) AVERAGE VALUE OF HIGH-SPEED MONITORING CURRENT VALUE | | | | |
| (4) AREA OF GROUP OF PIXELS | | | | |
| (5) BARYCENTRIC COORDINATES | | | | |
| (6) NUMBER OF CELL GROUPS | | | | |
| PRIORITY | | | | |

FIG. 16

DISPLAY DEVICE

TECHNICAL FIELD

The disclosure relates to a display device.

BACKGROUND ART

PTL 1 discloses a method in which a display region of a display is classified into a plurality of clusters, characteristics of some pixels included in each of the plurality of clusters are measured, and based on a measurement result, whether or not a pixel is in a state in which correction is necessary, such as a state in which aged deterioration or excessive correction occurs is determined. Then, according to the method, a cluster in which a pixel requiring correction is found is assumed to have a high possibility that the other pixels belonging to the cluster also require correction. After that, a priority of the cluster is raised, and the number of pixels whose characteristics are measured is increased for a cluster having a higher priority among the plurality of clusters. According to PTL 1, this achieves a high estimation speed and concentrates the correction on a region where a characteristic change is most serious.

CITATION LIST

Patent Literature

PTL 1: JP 2014-517346 T

SUMMARY

Technical Problem

According to the method disclosed in PTL 1, a cluster having a low priority has a small number of pixels whose characteristics are measured. Thus, even when a pixel that originally needs to be corrected is included in a cluster having a low priority, it is difficult to find the pixel, and display quality of a display image is likely to be deteriorated. An object of an aspect of the disclosure is to provide a display device in which detection accuracy of a pixel requiring deterioration compensation is high and an increase in time period to be required for the deterioration compensation is suppressed.

Solution to Problem

According to an aspect of the disclosure, there is provided a display device including a display panel including a plurality of pixels, a focused monitoring region setting unit configured to set a focused monitoring region including a group of pixels to be subjected to deterioration monitoring, the deterioration monitoring being configured to measure a decrease amount of a current-voltage characteristic among the plurality of pixels, and a deterioration monitoring control unit configured to perform the deterioration monitoring on the group of pixels included in the focused monitoring region, wherein the focused monitoring region setting unit performs high-speed monitoring to be performed at a higher speed than a speed of the deterioration monitoring, thus obtains a high-speed monitoring measurement value indicating the decrease amount of the current-voltage characteristic of each of the plurality of pixels, and determines a pixel group having the high-speed monitoring measurement value out of an allowable range as the group of pixels to be subjected to the deterioration monitoring.

BRIEF DESCRIPTION OF DRAWINGS

FIG. 16 is a diagram illustrating an example of a priority list in which a region setting unit gives priorities to a plurality of focused monitoring regions according to the embodiment.

DESCRIPTION OF EMBODIMENTS

Embodiments

Figure 1:
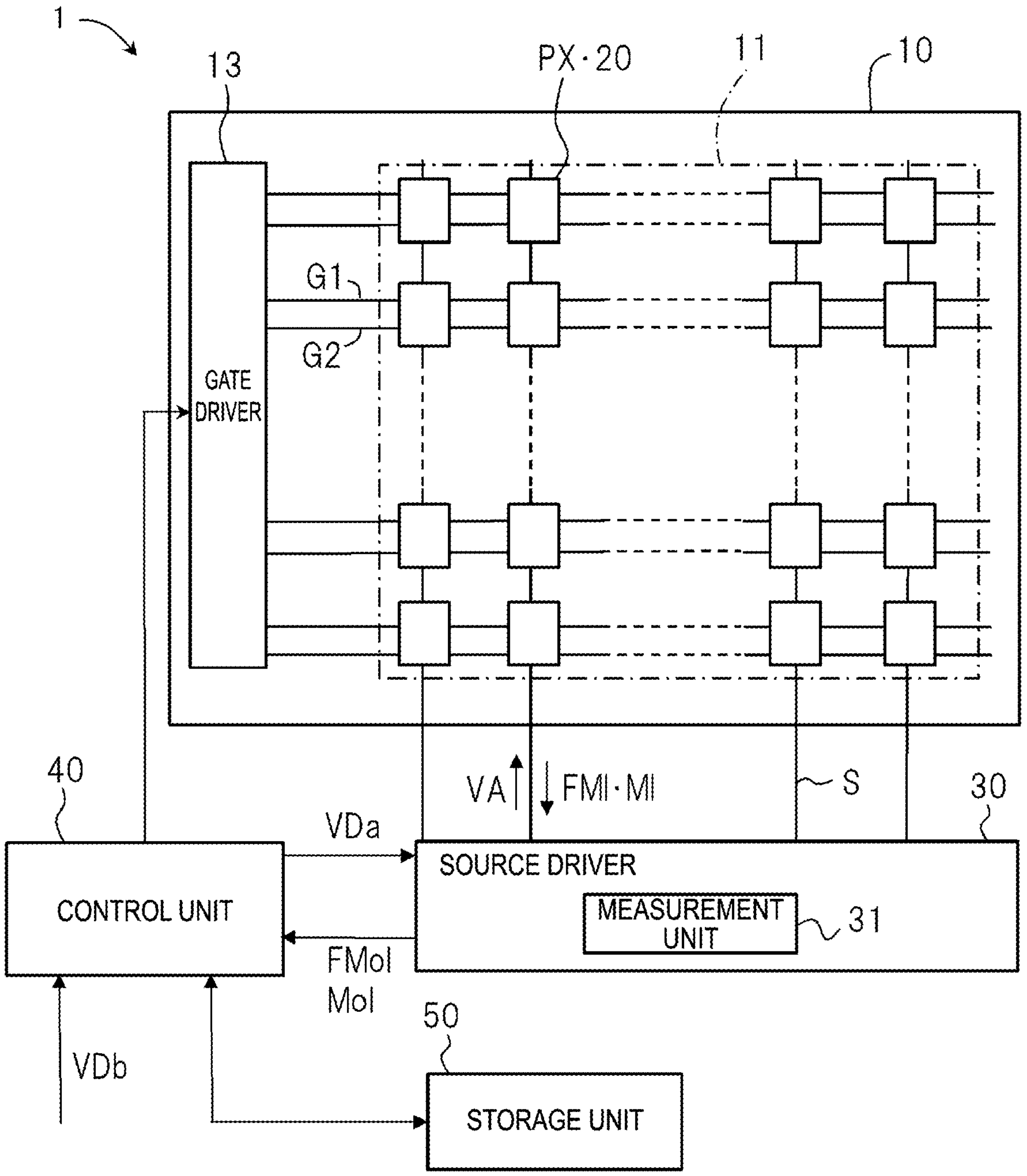
FIG. 1 is a diagram illustrating a schematic configuration of a display device according to an embodiment.

FIG. 1 is a diagram illustrating a schematic configuration of a display device 1 according to an embodiment. The display device 1 includes a display panel 10, a source driver 30, a control unit 40, and a storage unit 50. The display panel 10 includes a plurality of pixels PX, a gate driver 13, a plurality of gate lines G1, a plurality of monitoring control lines G2, and a plurality of data lines S. The plurality of pixels PX are provided in a matrix shape in a display region 11 for an image of the display panel 10. Each of the plurality of pixels PX includes a pixel circuit 20 including a light-emitting element.

In the display panel 10, for example, the plurality of pixels PX emit light to display an image in the display region 11. Examples of the display panel 10 include, for example, an organic Electro-Luminescence (EL) display panel with an Organic Light-Emitting Diode (OLED) used as the light-emitting element or a Quantum dot Light-Emitting Diode (QLED) display panel with a QLED used as the light-emitting element. Note that it is sufficient that the display panel 10 is a display panel including a light-emitting element, and the display panel 10 is not limited to an organic EL display panel or a QLED display panel.

The plurality of gate lines G1 and the plurality of monitoring control lines G2 are in one-to-one correspondence and extend substantially parallel with each other. The plurality of data lines S extend so as to intersect with the plurality of gate lines G1 and the plurality of monitoring control lines G2. The respective pixels PX are provided at portions where the plurality of gate lines G1 and the plurality of monitoring control lines G2 intersect with the plurality of data lines S.

The gate driver 13 may be provided on a substrate included in the display panel 10, for example. Alternatively, the gate driver 13 may be provided outside the substrate included in the display panel 10. One end portion of each of the plurality of gate lines G1 and the plurality of monitoring control lines G2 is connected to the gate driver 13. The gate driver 13 includes a shift register, a logic circuit, and the like, for example. The gate driver 13 drives each of the plurality of gate lines G1 and the plurality of monitoring control lines G2 based on a gate control signal output from the control unit 40.

The gate driver 13 outputs a scanning signal for selecting the plurality of pixels PX for each row to each of the plurality of pixels PX through the corresponding plurality of gate lines G1. Further, when high-speed monitoring and deterioration monitoring are performed, the gate driver 13 outputs a monitoring control signal for selecting the plurality of pixels PX for each row to each of the plurality of pixels PX through each of the plurality of monitoring control lines G2.

Note that although details will be described later, the deterioration monitoring is a process of obtaining a compensation voltage value CV (see FIG. 2) representing a decrease amount of a current-voltage characteristic of each of the plurality of pixels PX by measurement. The compensation voltage value CV is used to create a compensation value CM (see FIG. 2) for performing deterioration compensation on each of the plurality of pixels PX having deteriorated current-voltage characteristics. Thus, the deterioration monitoring is a relatively time-consuming process because it is necessary to obtain the compensation voltage value CV that requires a certain degree of accuracy. In addition, the high-speed monitoring is a process of obtaining a high-speed monitoring measurement value FMo representing a decrease amount of the current-voltage characteristic of each of the plurality of pixels PX in order to set a region in which the deterioration monitoring is to be performed in the display region 11. Since the high-speed monitoring is a process of measuring a decrease in the current-voltage characteristic of each of the plurality of pixels PX more simply than the deterioration monitoring, a time period to be required for the measurement is shorter than that of the deterioration monitoring.

For example, the source driver 30 includes a measurement unit 31. The source driver 30 is connected to one end portion of each of the plurality of data lines S. The source driver 30 drives the respective plurality of pixels PX through the plurality of data lines S based on a source control signal output from the control unit 40. For example, when the source driver 30 obtains an image signal VDa to be supplied to the pixel PX from the control unit 40, the source driver 30 generates an image signal VA that is an analog signal (gray-scale voltage) based on the image signal VDa that is a digital signal, and supplies the image signal VA to the data line S. Accordingly, each of the plurality of pixels PX emits light, and an image is displayed in the display region 11. Note that the image signal VDa supplied to the source driver 30 from the control unit 40 is a signal obtained by performing the deterioration compensation (correction) on an input image signal VDb that is an image signal input to the control unit 40 from the outside based on the compensation value CM by the control unit 40. Note that as will be described later with reference to FIG. 2, the compensation value CM is obtained based on the compensation voltage value CV obtained by performing the deterioration monitoring by the control unit 40.

The measurement unit 31 is a current measurement circuit. Based on an instruction from the control unit 40, the measurement unit 31 measures a high-speed monitoring current FMI that is an analog signal output from the data line S in performing the high-speed monitoring, and outputs a high-speed monitoring current value (high-speed monitoring measurement value) FMoI that is a measurement value to the control unit 40. In addition, based on an instruction from the control unit 40, the measurement unit 31 of the source driver 30 measures a deterioration monitoring current MI that is an analog signal output from the data line S in performing the deterioration monitoring, and outputs a deterioration monitoring current value MoI that is a measurement value to the control unit 40.

For example, the measurement unit 31 may be configured as a circuit including a switch transistor, an amplifier, an AD converter, and the like. Note that the measurement unit 31 does not need to be included in the source driver 30 and may be provided outside the source driver 30. Alternatively, transmission of the image signal, transmission of the high-speed monitoring current FMI, and transmission of the deterioration monitoring current MI do not need to be performed using the same wiring line and different wiring lines may be used.

The control unit 40 controls operations of the gate driver 13 and the source driver 30 to display an image in the display region 11, to perform deterioration monitoring, and to perform the high-speed monitoring. The control unit 40 controls driving of the gate driver 13 by outputting the gate control signal to the gate driver 13. In addition, the control unit 40 controls driving of the source driver 30 by outputting the source control signal to the source driver 30. The control unit 40 includes, for example, an image processing unit that executes image processing and a timing controller that controls the operations of the gate driver 13 and the source driver 30. For example, the image processing unit can be configured using a Large-Scale Integration (LSI) such as a Graphics Processing Unit (GPU). For example, the timing controller can be configured using an LSI.

A flash memory or the like can be used as the storage unit 50, for example. Note that the storage unit 50 is not limited to a flash memory and may be a semiconductor memory such as a Static Random Access Memory (SRAM), a Dynamic Random Access Memory (DRAM), a Read Only Memory (ROM), or a Solid State Drive (SSD); a register; a magnetic storage device such as a Hard Disk Drive (HDD); or an optical storage device such as an optical disk device.

Figure 2:
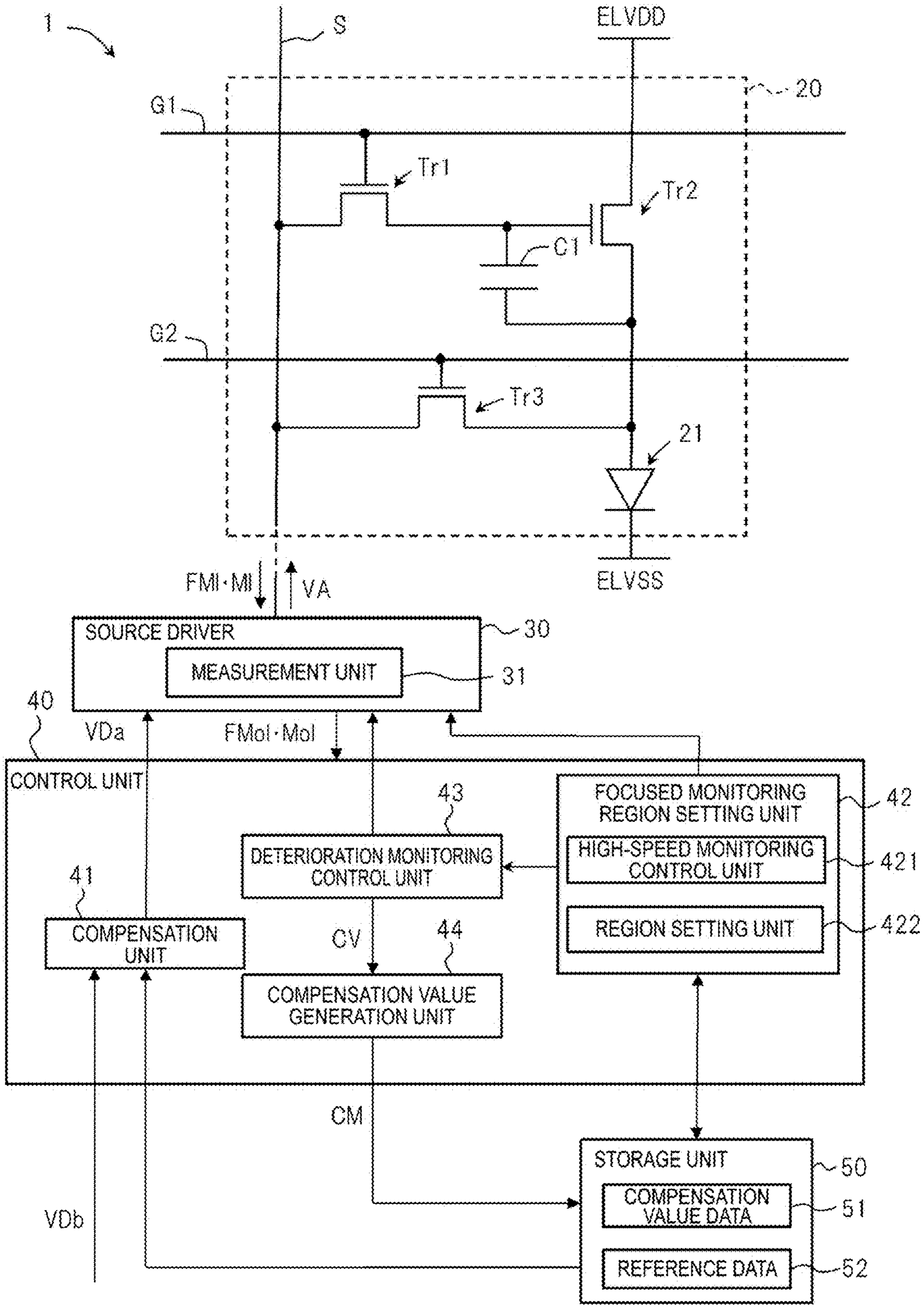
FIG. 2 is a diagram illustrating a schematic configuration of a pixel circuit, a source driver, a control unit, and a storage unit according to the embodiment.

FIG. 2 is a diagram illustrating a schematic configuration of the pixel circuit 20, the source driver 30, the control unit 40, and the storage unit 50 according to the embodiment. Next, each of the pixel circuit 20, the source driver 30, the control unit 40, and the storage unit 50 included in each pixel PX will be described in detail with reference to FIG. 2. Each pixel PX illustrated in FIG. 1 includes the pixel circuit 20. In FIG. 2, among a plurality of pixel circuits 20 included in the display device 1, one pixel circuit 20 is illustrated. For example, the pixel circuit 20 includes a light-emitting element 21, a capacitor C1, a selecting transistor Tr1, a drive transistor Tr2, and a monitoring control transistor Tr3.

The control unit 40 includes a compensation unit 41, a focused monitoring region setting unit 42, a deterioration monitoring control unit 43, and a compensation value generation unit 44. The storage unit 50 stores compensation value data 51 and reference data 52. The light-emitting element 21 may be a self-light-emitting element such as an Organic Light-Emitting Diode (OLED) or a Quantum dot Light-Emitting Diode (QLED), for example.

In the pixel circuit 20, one of terminals of the capacitor C1 is connected to a drain terminal of the selecting transistor Tr1 and a gate terminal of the drive transistor Tr2, and the other is connected to a source terminal of the drive transistor Tr2, an anode of the light-emitting element 21, and a drain terminal of the monitoring control transistor Tr3. The anode of the light-emitting element 21 is connected to the source terminal of the drive transistor Tr2, the drain terminal of the monitoring control transistor Tr3, and the other terminal of the capacitor C1, and a cathode thereof is connected to a low-level power source line ELVSS.

The selecting transistor Tr1 is provided between the data line S, and the capacitor C1 and the gate terminal of the drive transistor Tr2. A gate terminal of the selecting transistor Tr1 is connected to the gate line G1, a source terminal thereof is connected to the data line S, and the drain terminal thereof is connected to the gate terminal of the drive transistor Tr2 and the one terminal of the capacitor C1.

The drive transistor Tr2 is connected to the light-emitting element 21 in series. The gate terminal of the drive transistor Tr2 is connected to the drain terminal of the selecting transistor Tr1 and the one terminal of the capacitor C1, a drain terminal thereof is connected to the high-level power source line ELVDD, and the source terminal thereof is connected to the anode of the light-emitting element 21, the other terminal of the capacitor C1, and the drain terminal of the monitoring control transistor Tr3.

The monitoring control transistor Tr3 is provided between the source terminal of the drive transistor Tr2 and the anode of the light-emitting element 21, and the data line S. A gate terminal of the monitoring control transistor Tr3 is connected to the monitoring control line G2, the drain terminal thereof is connected to the source terminal of the drive transistor Tr2, the other terminal of the capacitor C1, and the anode of the light-emitting element 21, and a source terminal thereof is connected to the data line S.

When the high-speed monitoring is performed, the measurement unit 31 measures the high-speed monitoring current FMI that is an analog signal output from the data line S based on an instruction from the control unit 40, and outputs the high-speed monitoring current value FMoI that is a measurement value to the control unit 40. In addition, when the deterioration monitoring is performed, the measurement unit 31 measures the deterioration monitoring current MI that is an analog signal output from the data line S based on an instruction from the control unit 40, and outputs the deterioration monitoring current value MoI that is a measurement value to the control unit 40. For example, the measurement unit 31 is a current measurement circuit. For example, the measurement unit 31 may be configured as a circuit including a switch transistor, an amplifier, an AD converter, and the like.

For example, the storage unit 50 stores the compensation value data 51 and the reference data 52. The compensation value data 51 is data for compensating the current-voltage characteristic of each of the plurality of pixels PX in which the current-voltage characteristics are deteriorated. Specifically, the compensation value data 51 is data indicating, for each of the plurality of pixels PX, the compensation value CM for performing deterioration compensation (that is, correction) on the input image signal VDb to obtain the image signal VDa. The compensation value data 51 includes data indicating the compensation value CM for each of the plurality of pixels PX. The compensation value CM is generated by the compensation value generation unit 44 based on the compensation voltage value CV obtained by performing the deterioration monitoring. The compensation value data 51 may be, for example, data representing a look-up table indicating, as information, a correspondence relationship between the input image signal VDb and the image signal VDa (for example, a correspondence relationship between gray-scale voltages before and after the correction), may be data indicating, as information, an arithmetic expression for obtaining the image signal VDa from the input image signal VDb (for example, a gray-scale voltage after the correction from the input gray-scale voltage), and may be data including other information for obtaining the image signal VDa from the input image signal VDb.

The reference data 52 is data that is used when a high-speed monitoring control unit 421 determines whether or not the high-speed monitoring current value FMoI obtained by performing the high-speed monitoring is within an allowable range. In other words, the reference data 52 is data for the high-speed monitoring control unit 421 to determine whether or not the decrease amount of the current-voltage characteristic in the pixel circuit 20 is within the allowable range. For example, it is sufficient that the reference data 52 can specify whether or not the decrease amount of the current-voltage characteristic in the pixel circuit 20 is within the allowable range, and, for example, the reference data 52 may include reference value data indicating a predetermined reference value and predetermined range data indicating a predetermined range for specifying the allowable range with respect to the reference value.

The compensation unit 41 performs deterioration compensation (that is, correction) on the input image signal VDb (an image signal before the deterioration compensation) that is an image signal input from the outside, by using the compensation value CM indicating the compensation value data 51 stored in the storage unit 50 to generate the image signal VDa subjected to the deterioration compensation. Then, the control unit 40 outputs the image signal VDa to the source driver 30.

The focused monitoring region setting unit 42 specifies a group of pixels on which the deterioration monitoring control unit 43 needs to perform the deterioration monitoring for measuring the decrease amounts of the current-voltage characteristics among the plurality of pixels PX provided in the display region 11. The focused monitoring region setting unit 42 includes, for example, the high-speed monitoring control unit 421 and a region setting unit 422.

The high-speed monitoring control unit 421 outputs an instruction signal to the source driver 30 to perform the high-speed monitoring. The high-speed monitoring control unit 421 specifies, among the plurality of pixels PX provided in the display region 11, a plurality of pixels PX in which the decrease amounts of the current-voltage characteristics are out of the allowable range by performing the high-speed monitoring. A timing at which the high-speed monitoring control unit 421 performs the high-speed monitoring is not particularly limited, and may be, for example, a timing during an image display period, a timing during a vertical blanking period, a timing immediately after the display device 1 is powered on, a timing when the display device 1 is powered off, or the like. However, since the high-speed monitoring is performed in order to determine the group of pixels PX that need to be subjected to the deterioration monitoring by the deterioration monitoring control unit 43, the high-speed monitoring is performed before the deterioration monitoring is performed.

The region setting unit 422 generates mapping data FD (see FIG. 4) in which positions of the plurality of pixels PX in which the decrease amount of the current-voltage characteristic of each of the plurality of pixels PX obtained by the high-speed monitoring control unit 421 performing the high-speed monitoring is out of the allowable range are mapped, and sets a focused monitoring region FAR (see FIG. 7) for causing the deterioration monitoring control unit 43 to perform the deterioration monitoring based on the generated mapping data FD.

Figure 7:
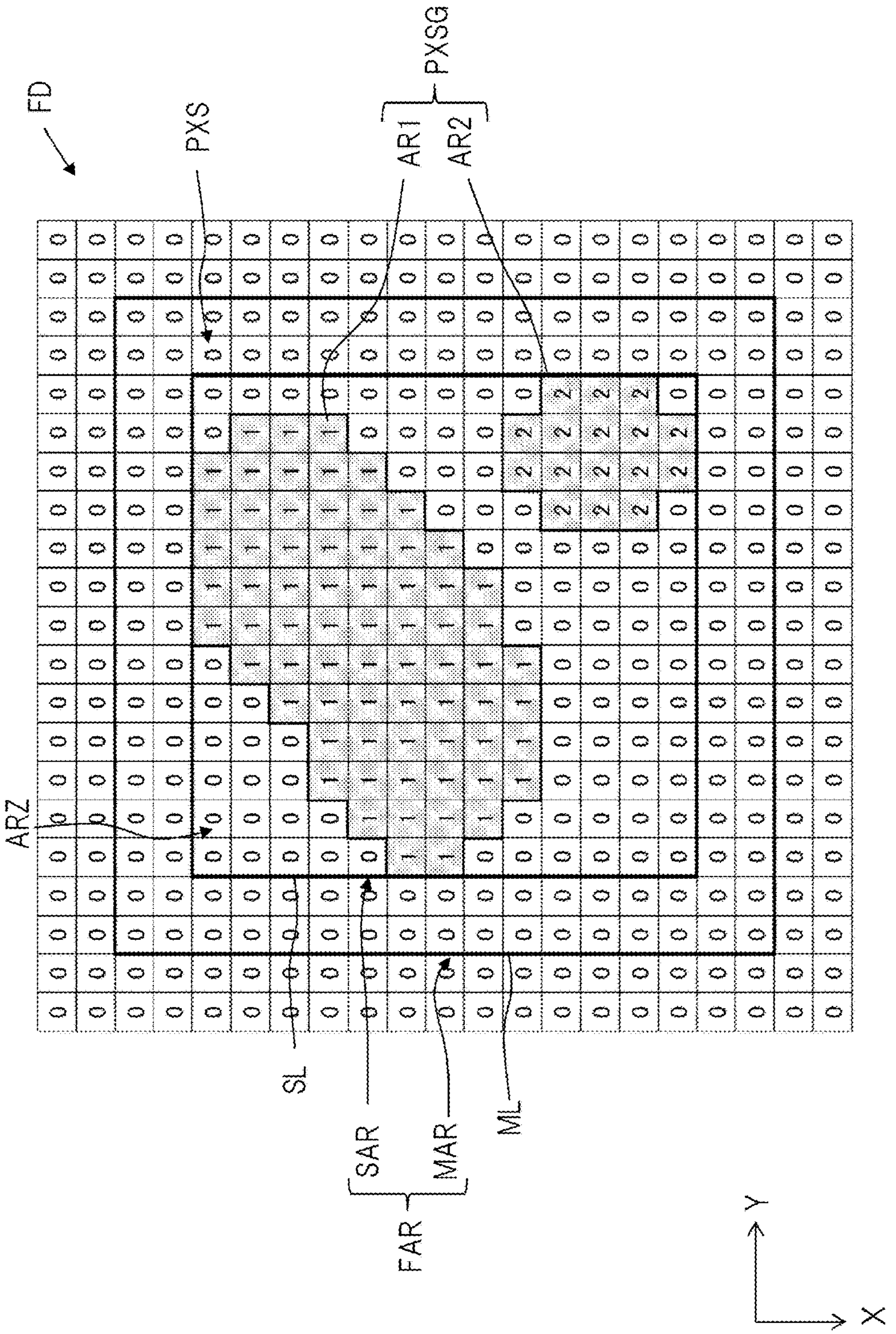
FIG. 7 is a diagram illustrating an example of mapping data FD in which a margin region has been set by the region setting unit according to the embodiment.

Then, the region setting unit 422 causes the deterioration monitoring control unit 43 to perform the deterioration monitoring of each of the group of pixels (a group of cells PXSG (see FIG. 7)) included in the set focused monitoring region FAR (see FIG. 7). Note that when an area of the focused monitoring region FAR (see FIG. 7) exceeds a predetermined number, the region setting unit 422 may cause the deterioration monitoring control unit 43 to perform the deterioration monitoring not only for the group of pixels included in the focused monitoring region FAR (see FIG. 7) but also for all the plurality of pixels PX provided in the display region 11.

In response to an instruction from the region setting unit 422, the deterioration monitoring control unit 43 performs the deterioration monitoring of each of the group of pixels (the group of cells PXSG (see FIG. 7)) included in the focused monitoring region FAR (see FIG. 7) set by the region setting unit 422 among the plurality of pixel circuits 20 provided in the display region 11, and obtains the compensation voltage value CV indicating a decrease in current-voltage characteristic as information from each of the group of pixels (the group of cells PXSG (see FIG. 7)). Alternatively, the deterioration monitoring control unit 43 may perform the deterioration monitoring of all the plurality of pixel circuits 20 provided in the display region 11 in response to an instruction from the region setting unit 422, and may obtain the compensation voltage value CV indicating a decrease in current-voltage characteristic as information from each of all the plurality of pixel circuits 20.

The deterioration monitoring performed by the deterioration monitoring control unit 43 is, for example, processing in which a deterioration monitoring voltage is supplied to each pixel PX while being swept (raised stepwise), and a deterioration monitoring voltage value when the deterioration monitoring current value MoI output from each pixel PX and measured by the measurement unit 31 becomes equal to or larger than a predetermined value is obtained to be deterioration information Mo. A timing at which the deterioration monitoring control unit 43 performs the deterioration monitoring is not particularly limited, and may be, for example, a timing during an image display period, a timing during a vertical blanking period, a timing immediately after the display device 1 is powered on, a timing when the display device 1 is powered off, or the like.

The compensation value generation unit 44 generates the compensation value CM for each of the plurality of pixels PX on which the deterioration monitoring is performed based on the compensation voltage value CV obtained by the deterioration monitoring control unit 43, and stores the generated compensation value CM in the compensation value data 51 stored in the storage unit 50, that is, updates the compensation value data 51. The compensation value generation unit 44 may use the compensation voltage value CV as it is as the compensation value CM, or may obtain the compensation value CM by applying various types of correction to the compensation voltage value CV.

Additionally, although details will be described later with reference to FIG. 9 to FIG. 11, when the deterioration monitoring is performed on the focused monitoring region FAR (see FIG. 7) that is a part of the display region 11, the compensation value generation unit 44 may perform correction to bring the compensation value CM in the focused monitoring region FAR (see FIG. 7) closer to the compensation value CM outside the focused monitoring region FAR (see FIG. 7) (the compensation value CM indicated by the compensation value data 51 stored in the storage unit 50) in order to suppress a step in level of the compensation value CM inside the focused monitoring region FAR (see FIG. 7) with respect to the compensation value CM outside the focused monitoring region FAR (see FIG. 7) (in order to suppress overall shift in numerical value) due to a timing difference in performing the deterioration monitoring between the inside and the outside of the focused monitoring region FAR (see FIG. 7).

Next, operations of the pixel circuit 20 will be described with reference to FIG. 2. In the image display period, that is, in a gray-scale voltage writing period, the gate line G1 is in an active state (selected state), and the monitoring control line G2 is in a non-active state (non-selected state). This causes the selecting transistor Tr1 to be set to an on state and causes the monitoring control transistor Tr3 to be set to an off state.

Then, when the input image signal VDb is input from the outside to the control unit 40, the compensation unit 41 performs the deterioration compensation (correction) on the input image signal VDb based on a compensation value indicated by the compensation value data 51 stored in the storage unit 50 to generate the image signal VDa after the deterioration compensation.

Then, in the pixel circuit 20, the image signal voltage VA according to a target brightness of the light-emitting element 21 is supplied from the source driver 30 to the data line S according to the image signal VDa supplied from the control unit 40 to the source driver 30, and the capacitor C1 is charged by the supplied image signal voltage VA. As a result, a current flows between the drain terminal and the source terminal of the drive transistor Tr2 and further flows between the anode and the cathode of the light-emitting element 21. Thus, the light-emitting element 21 emits light at the target brightness.

Additionally, when the deterioration monitoring and the high-speed monitoring are performed, first, the gate line G1 is in the active state (selected state), and the monitoring control line G2 is in the non-active state (non-selected state).

Then, when the high-speed monitoring control unit 421 (in performing the high-speed monitoring) or the deterioration monitoring control unit 43 (in performing the deterioration monitoring) supplies a predetermined voltage (in performing the high-speed monitoring) for measuring the current-voltage characteristic of the drive transistor Tr2 or a deterioration monitoring voltage (in performing the deterioration monitoring) to the data line S via the source driver 30, the supplied predetermined voltage (in performing the high-speed monitoring) or deterioration monitoring voltage (in performing the deterioration monitoring) charges the capacitor C1.

Next, the gate line G1 is set to a non-active state (non-selected state), and the current according to the charged voltage of the capacitor C1 flows into the drive transistor Tr2. Then, the high-speed monitoring control unit 421 (in performing the high-speed monitoring) or the deterioration monitoring control unit 43 (in performing the deterioration monitoring) stops the supply of the predetermined voltage (in performing the high-speed monitoring) or the deterioration monitoring voltage (in performing the deterioration monitoring) being supplied to the data line S. Then, the high-speed monitoring control unit 421 (in performing the high-speed monitoring) or the deterioration monitoring control unit 43 (in performing the deterioration monitoring) switches a mode of the source driver 30 to a mode in which a current can be measured.

Next, the monitoring control line G2 is set to an active state (selected state), and the monitoring control transistor Tr3 is set to the on state. As a result, the high-speed monitoring current FMI (in performing the high-speed monitoring) or the deterioration monitoring current MI (in performing the deterioration monitoring) flows between the drain terminal and the source terminal of the drive transistor Tr2, does not flow into the light-emitting element 21, flows between the drain terminal and the source terminal of the monitoring control transistor Tr3, and is supplied to the source driver 30 through the data line S. Then, the high-speed monitoring current FMI (in performing the high-speed monitoring) or the deterioration monitoring current MI (in performing the deterioration monitoring) supplied to the source driver 30 is measured by the measurement unit 31 to obtain the high-speed monitoring current value FMoI (in performing the high-speed monitoring) or the deterioration monitoring current value MoI (in performing the deterioration monitoring) as a measurement value. Then, the measurement unit 31 outputs the measured high-speed monitoring current value FMoI (in performing the high-speed monitoring) or the measured deterioration monitoring current value MoI (in performing the deterioration monitoring) to the control unit 40.

In this way, the high-speed monitoring control unit 421 obtains the high-speed monitoring current value FMoI of each pixel circuit 20 in performing the high-speed monitoring. Additionally, in performing the deterioration monitoring, the deterioration monitoring control unit 43 obtains the deterioration monitoring current value MoI from each pixel circuit 20.

Note that in addition to or instead of the information indicating the current-voltage characteristic between the drain terminal and the source terminal of the drive transistor Tr2, the display device 1 may obtain information indicating the current-voltage characteristic of the light-emitting element 21 to obtain a measurement result indicating the decrease amount of the current-voltage characteristic of the pixel circuit 20.

The information indicating the current-voltage characteristic of the light-emitting element 21 may be obtained, for example, as follows. For example, first, the gate line G1 is in the active state (selected state), and the monitoring control line G2 is in the non-active state (non-selected state). Then, when the high-speed monitoring control unit 421 (in performing the high-speed monitoring) or the deterioration monitoring control unit 43 (in performing the deterioration monitoring) supplies a voltage (for example, 0 V) for setting the drive transistor Tr2 to an off state to the data line S, the drive transistor Tr2 is set to the off state.

Next, the gate line G1 is set to the non-active state (non-selected state), and the drive transistor Tr2 is fixed in the off state. Then, the monitoring control line G2 is set to the active state (selected state), and the monitoring control transistor Tr3 is set to the on state.

Then, when the high-speed monitoring control unit 421 (in performing the high-speed monitoring) or the deterioration monitoring control unit 43 (in performing the deterioration monitoring) supplies a predetermined voltage (in performing the high-speed monitoring) for measuring the current-voltage characteristic of the light-emitting element 21 or the deterioration monitoring voltage (in performing the deterioration monitoring) to the data line S, a current flows from the source driver 30 through the data line S, flows between the source terminal and the drain terminal of the monitoring control transistor Tr3, and flows between the anode and the cathode of the light-emitting element 21. Thus, the light-emitting element 21 emits light. The measurement unit 31 measures the current flowing at this time. Accordingly, the measurement result indicating the decrease amount of the current-voltage characteristic of the pixel circuit 20 can be obtained. In addition, the high-speed monitoring control unit 421 (in performing the high-speed monitoring) or the deterioration monitoring control unit 43 (in performing the deterioration monitoring) can estimate luminous efficiency of the light-emitting element 21 from the above-described current value related to the light-emitting element 21 measured by the measurement unit 31.

Figure 3:
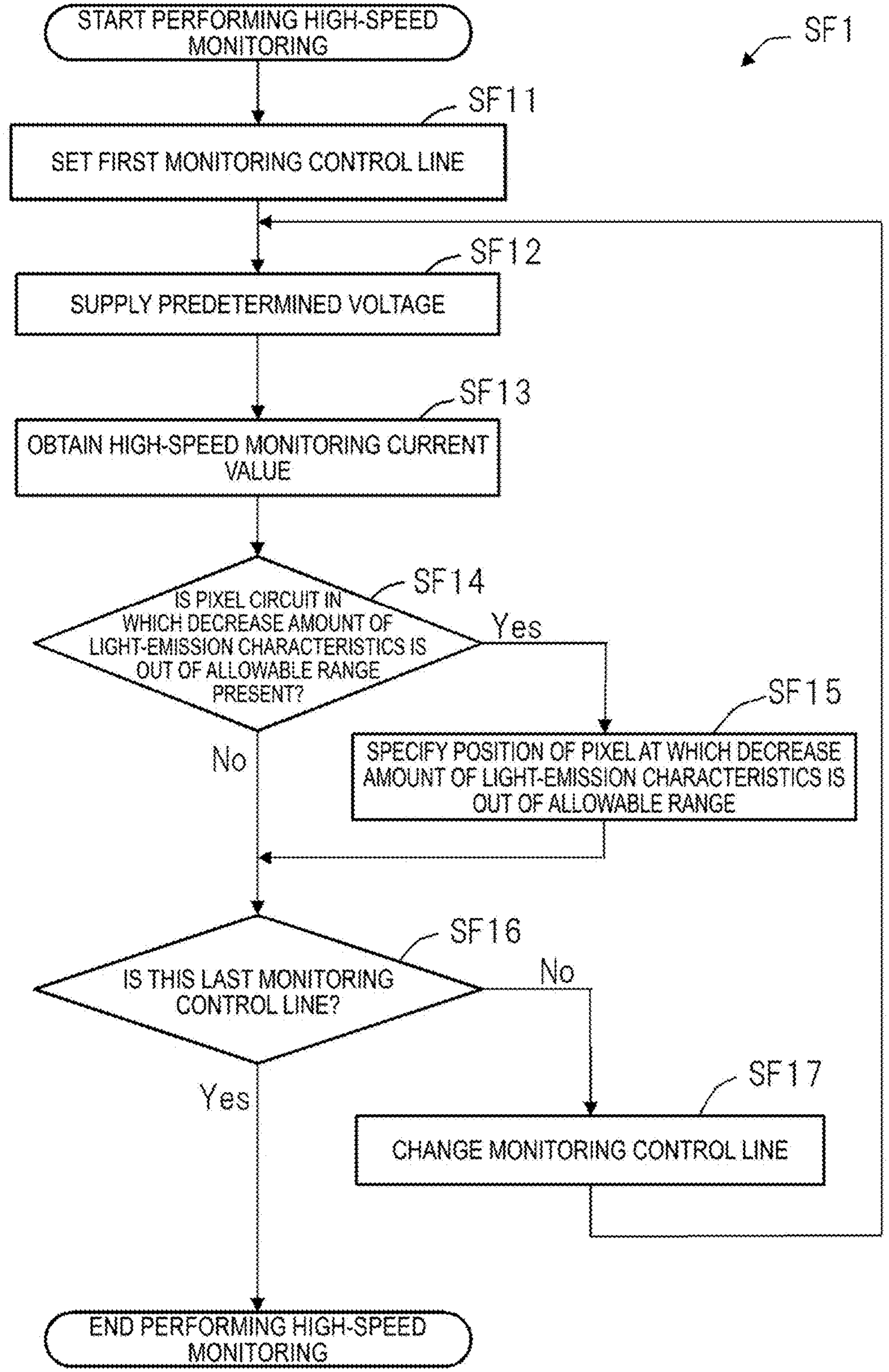
FIG. 3 is a diagram schematically illustrating a procedure of steps of performing high-speed monitoring that is performed by a high-speed monitoring control unit according to the embodiment.

Next, a procedure of processing in which the high-speed monitoring control unit 421 performs the high-speed monitoring will be described with reference to FIG. 2 and FIG. 3. FIG. 3 is a diagram schematically illustrating a procedure of a step SF1 of performing the high-speed monitoring to be performed by the high-speed monitoring control unit 421 according to the embodiment.

First, in step SF11, the high-speed monitoring control unit 421 sets the first monitoring control line G2 to start the high-speed monitoring from among the plurality of monitoring control lines G2. For example, the high-speed monitoring control unit 421 sets, among the plurality of monitoring control lines G2 provided in the display region 11, the monitoring control line G2 provided at the top of the display region as the first monitoring control line G2 to start the high-speed monitoring. Next, in step SF12, the high-speed monitoring control unit 421 controls the gate line G1 or the like corresponding to the set monitoring control line G2 via the source driver 30, and supplies the predetermined voltage set in advance to the drive transistors Tr2 included in the pixel circuits 20 for one line and connected to the set monitoring control line G2.

Then, in step SF13, the high-speed monitoring control unit 421 obtains the high-speed monitoring current value FMoI that is an output current from all the pixel circuits 20 including the drive transistors Tr2 supplied with the predetermined voltage and that is the high-speed monitoring current value FMoI measured by the measurement unit 31. Accordingly, the high-speed monitoring control unit 421 obtains the high-speed monitoring current values FMoI from all the pixel circuits 20 for the one line connected to the set monitoring control line G2.

Next, in step SF14, the high-speed monitoring control unit 421 refers to the reference data 52 stored in the storage unit 50, and determines whether or not the pixel circuit 20 in which the decrease amount of the current-voltage characteristic of the drive transistor Tr2 is out of the allowable range is present among all the pixel circuits 20 for the one line connected to the set monitoring control line G2. In step SF14, when the pixel circuit 20 in which the decrease amount of the current-voltage characteristic is out of the allowable range is present (in a case of YES in step SF14), in step SF15, the high-speed monitoring control unit 421 specifies a position of the pixel circuit 20 in which the decrease amount of the current-voltage characteristic is out of the allowable range, and proceeds to the next step SF16. In step SF14, when the pixel circuit 20 in which the decrease amount of the current-voltage characteristic is out of the allowable range is not present (in a case of NO in step SF14), the processing proceeds to the next step SF16.

Next, in step SF16, the high-speed monitoring control unit 421 determines whether or not the set monitoring control line G2 is the last monitoring control line G2. In step SF16, when the high-speed monitoring control unit 421 determines that the set monitoring control line G2 is not the last monitoring control line G2 (in a case of NO in step SF16), next, in step SF17, the set monitoring control line G2 is changed by the gate driver 13 selecting the monitoring control line G2 adjacent thereto, and the processing returns to step SF12. Then, the supplying of the predetermined voltage and the obtaining of the high-speed monitoring current values FMoI from all the pixel circuits 20 connected to the one monitoring control line G2 are repeated one line by one line, to the last monitoring control line G2, through the processing of steps SF12, SF13, SF14, and SF15 (that is performed as necessary), the processing in the case of NO in step SF16, and the processing of step SF17.

Then, in step SF16, when the high-speed monitoring control unit 421 determines that the set monitoring control line G2 is the last monitoring control line G2 (in the case of YES in step SF16), the high-speed monitoring control unit 421 ends the high-speed monitoring. Thereafter, the processing proceeds to a process in which the region setting unit 422 sets a focused monitoring region, which will be described with reference to FIG. 4 and the subsequent figures.

As described above, in the high-speed monitoring performed by the high-speed monitoring control unit 421, the predetermined voltage that is a preset voltage common to all the pixel circuits 20 is supplied one line by one line to the drive transistors Tr2 included in the plurality of pixel circuits 20 for each line and the high-speed monitoring current value FMoI from each of the plurality of pixel circuits 20 is measured one line by one line instead of sweeping a voltage (increasing a voltage stepwise) to be supplied to each pixel circuit 20 as in the deterioration monitoring, which will be described later. Thus, the current-voltage characteristic of each pixel circuit 20, that is, the current-voltage characteristic can be measured at a higher speed in an easier way than those of the deterioration monitoring.

Next, a specific example of a process in which the focused monitoring region setting unit 42 sets a focused monitoring region will be described with reference to FIG. 4 to FIG. 7. Note that in each figure, a direction from a top toward a bottom may be referred to as an X direction (positive X direction), and a direction from a left toward a right, which is a direction orthogonal to the X direction, may be referred to as a Y direction (positive Y direction).

Figure 4:
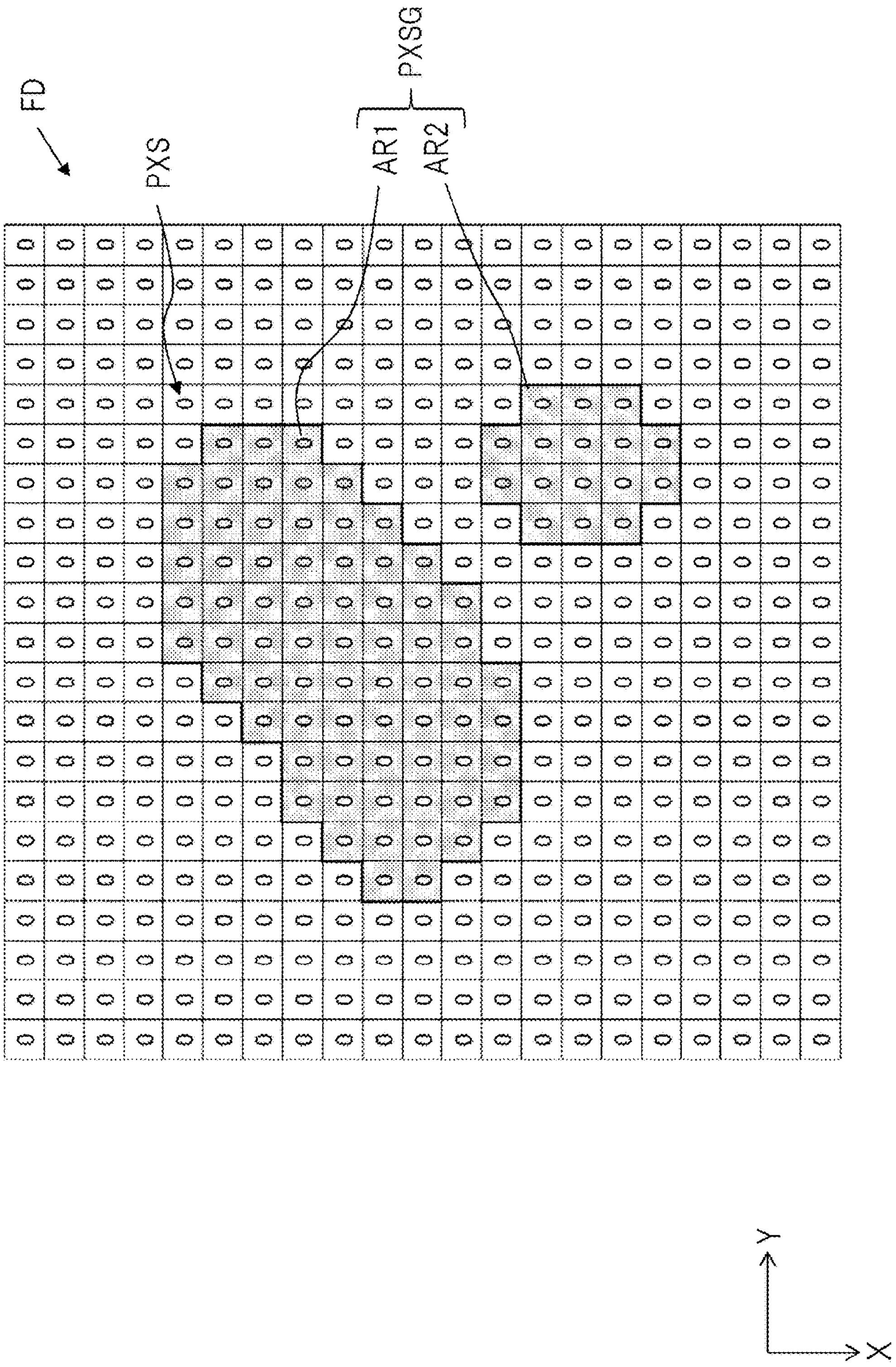
FIG. 4 is a diagram illustrating an example of mapping data created based on a performance result of the high-speed monitoring according to the embodiment.

FIG. 4 is a diagram illustrating an example of the mapping data FD created based on the performance result of the high-speed monitoring according to the embodiment. As described above, the high-speed monitoring control unit 421 obtains the high-speed monitoring current values FMoI from all the pixels PX provided in the display region 11 by performing the high-speed monitoring, and further refers to the reference data 52 stored in the storage unit 50 to specify positions of a plurality of pixels PX in which differences between the high-speed monitoring current value FMoI and the reference values in the reference data 52 exceed the predetermined range, that is, the decrease amounts of the current-voltage characteristics are out of the allowable range. Then, the high-speed monitoring control unit 421 outputs, to the region setting unit 422, information indicating the positions of the plurality of pixels PX in which the decrease amounts of the current-voltage characteristics are out of the allowable range, the information being obtained by performing the high-speed monitoring.

Then, as illustrated in FIG. 4, the region setting unit 422 creates the mapping data FD in which the positions of the plurality of pixels PX in which the decrease amounts of the current-voltage characteristics are out of the allowable range, the positions being obtained from the high-speed monitoring control unit 421 as the performance result of the high-speed monitoring, are mapped. The mapping data FD includes a plurality of cells PXS that are elements representing relative positions of the plurality of pixels PX provided in the display region 11 from each other. Each cell PXS corresponds to a respective one of the plurality of pixels PX provided in the display region 11. That is, coordinates corresponding to each of the positions of the plurality of pixels PX in the display region 11 are assigned to the corresponding cell PXS of the plurality of cells PXS in the mapping data FD. Thus, when the coordinate position of each cell PXS in the mapping data FD is specified, the pixel PX in the display region 11 corresponding to the specified cell PXS can also be specified.

Note that as will be described later with reference to FIG. 5, a labeling numerical value can be added to each cell PXS, and an example is illustrated in which in the mapping data FD illustrated in FIG. 4, a labeling numerical value "0" indicating that each cell PXS is in a state before labeling is added to each cell PXS because each cell PXS is in the state before labeling.

As illustrated in FIG. 4, for example, the region setting unit 422 sets a first cell group (first pixel group) AR1 and a second cell group (second pixel group) AR2 that are a group of cells (a group of pixels) PXSG representing the plurality of pixels PX determined that the decrease amounts of the current-voltage characteristics are out of the allowable range, the group of cells PXSG being obtained to be the performance result of the high-speed monitoring from the high-speed monitoring control unit 421, by mapping the first cell group AR1 and the second cell group AR2 in the mapping data FD. In FIG. 4, the first cell group AR1 and the second cell group AR2 are illustrated in gray. The first cell group AR1 and the second cell group AR2 are aggregates of a plurality of continuous cells PXS corresponding to the plurality of pixels PX that are determined that the decrease amounts of the current-voltage characteristics are out of the allowable range. The first cell group AR1 and the second cell group AR2 are not continuous regions, but regions separated from each other.

In this way, by setting the first cell group AR1 and the second cell group AR2 in the mapping data FD, the region setting unit 422 sets a group of pixels that are the plurality of pixels PX determined by the high-speed monitoring control unit 421 that the decrease amounts of the current-voltage characteristics are out of the allowable range among the plurality of pixels PX provided in the display region 11. The group of pixels includes a first pixel group that is an aggregate of a plurality of continuous pixels PX corresponding to the first cell group AR1 and a second pixel group that is an aggregate of continuous pixels PX corresponding to the second cell group AR2.

Note that since the group of cell groups (group of pixel groups) PXSG including the first cell group AR1 and the second cell group AR2 (that is, the first pixel group corresponding to the first cell group AR1 and the second pixel group corresponding to the second cell group AR2) is the group of cells (pixels) PXSG determined by the high-speed monitoring control unit 421 to perform the deterioration monitoring for measuring the decrease amounts of the current-voltage characteristics, the groups of cells PXSG may be referred to as a burn-in region where the degree of decrease in the current-voltage characteristics relatively proceeds.

Figure 5:
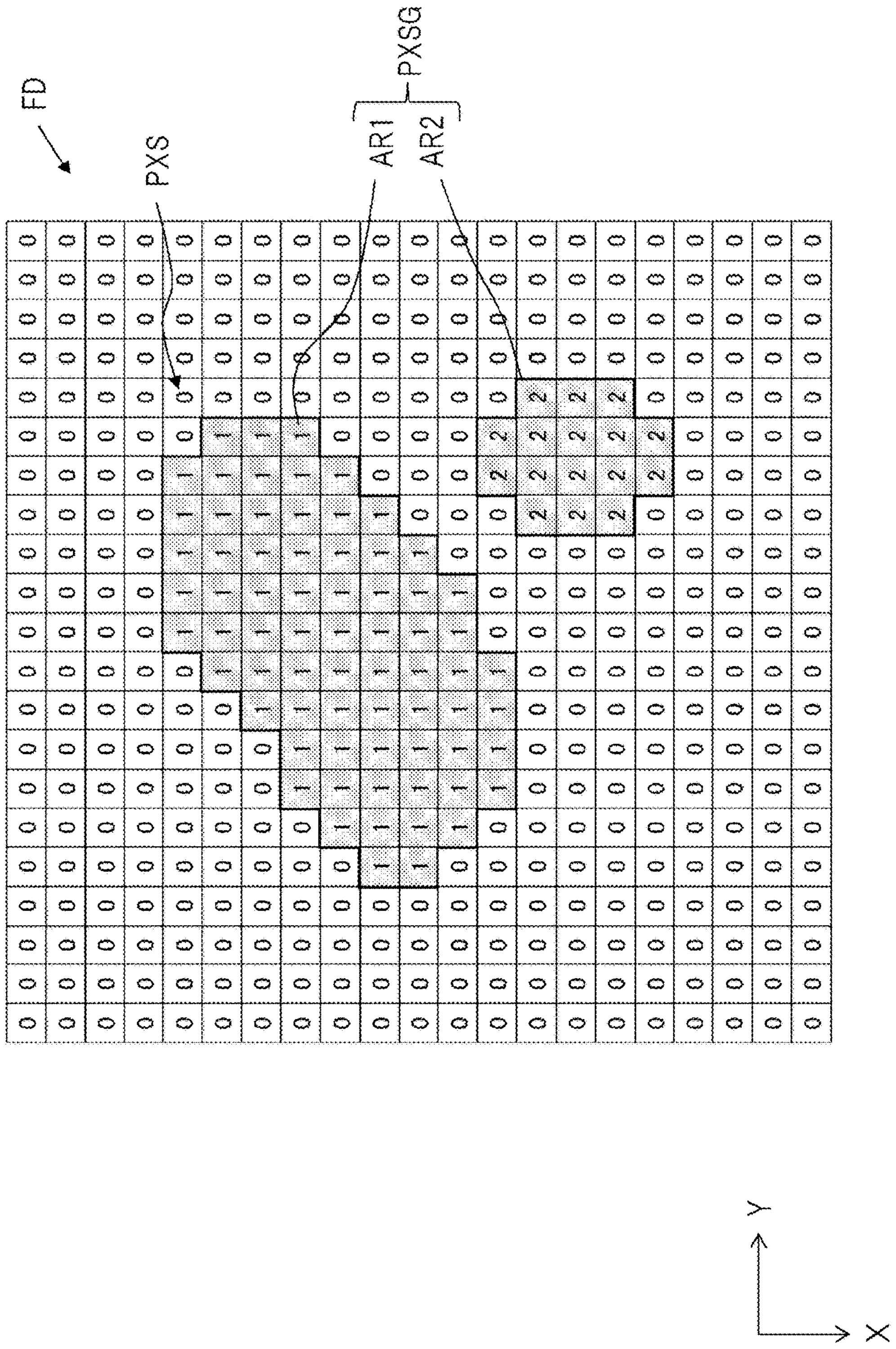
FIG. 5 is a diagram illustrating an example of mapping data labeled by a region setting unit according to the embodiment.

FIG. 5 is a diagram illustrating an example of the mapping data FD labeled by the region setting unit 422 according to the embodiment. As illustrated in FIG. 5, the region setting unit 422 sequentially labels each cell PXS in the mapping data FD in which the first cell group AR1 and the second cell group AR2 are set, and adds identification information to each cell PXS. In the example illustrated in FIG. 5, for example, the region setting unit 422 adds a labeling numerical value "1" as identification information to each of the plurality of cells PXS included in the first cell group AR1, adds a labeling numerical value "2" as identification information to each of the plurality of cells PXS included in the second cell group AR2, and adds a labeling numerical value "0" as identification information to the plurality of cells PXS not included in the first cell group AR1 and the second cell group AR2.

As described above, the region setting unit 422 adds labeling numerical values as different types of identification information to a cell group included in the first cell group AR1, a cell group included in the second cell group AR2, and a cell group not included in the first cell group AR1 and the second cell group AR2, so that the cell groups to which the cell group included in the first cell group AR1, the cell group included in the second cell group AR2, and the cell group not included in the first cell group AR1 and the second cell group AR2 belong can be easily identified and the plurality of cells PXS belonging to the same cell group can be easily integrally handled. As a result, it is possible to improve accuracy of data processing.

Note that when the region setting unit 422 labels each cell PXS, information added to each cell PXS is not limited to a numerical value, and any identification information such as a character, a graphic, or a symbol capable of identifying each cell PXS for each cell group to which the cells PXS belong such as the first cell group AR1, the second cell group AR2, and other cell groups can be used.

As described above, the region setting unit 422 sequentially labels each of the plurality of pixels PX provided in the display region 11 and adds the identification information, by sequentially labeling each of the cells PXS in the mapping data FD in which the first cell group AR1 and the second cell group AR2 are set and adding the identification information.

Figure 6:
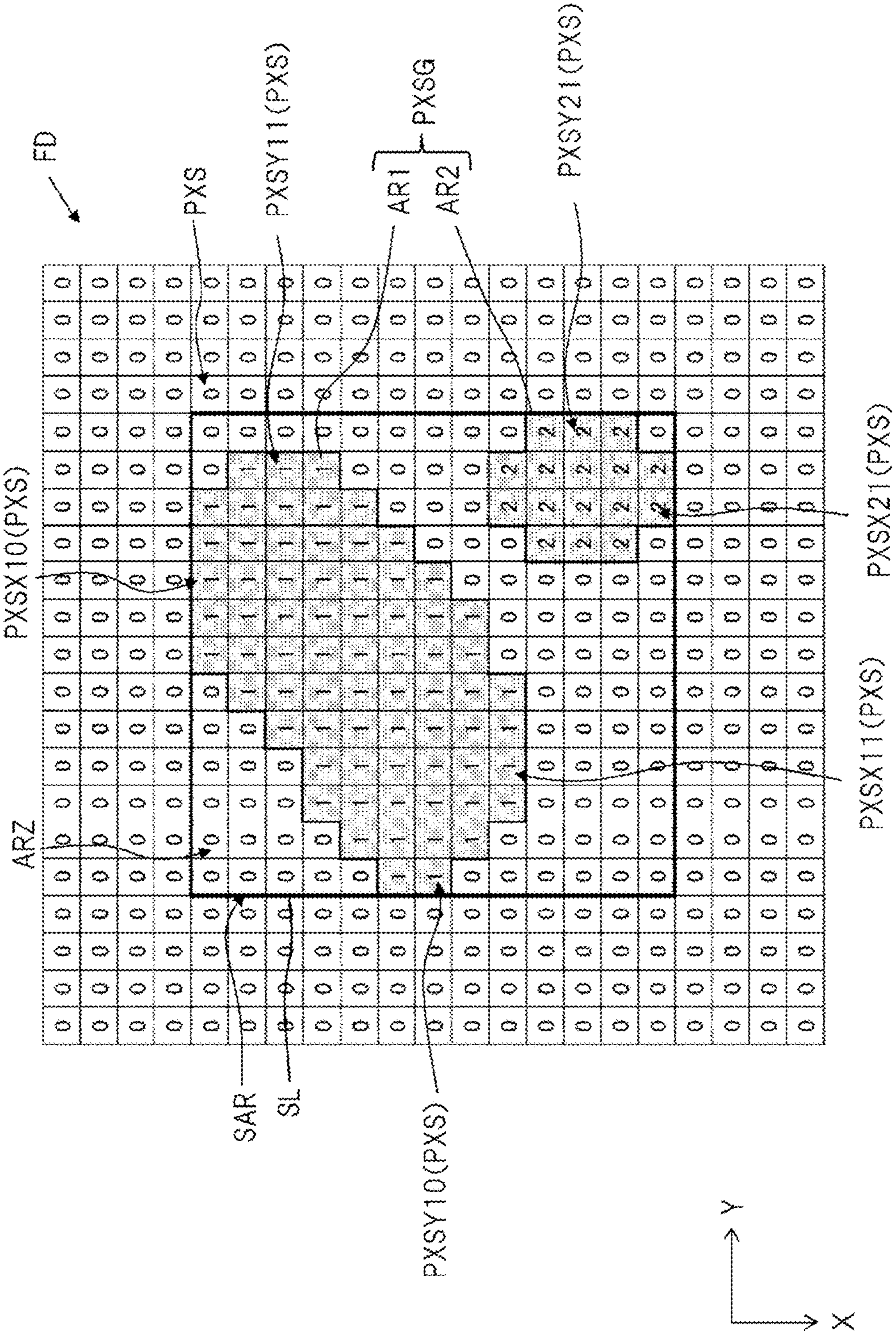
FIG. 6 is a diagram illustrating an example of mapping data in which a segment region has been set by the region setting unit according to the embodiment.

FIG. 6 is a diagram illustrating an example of the mapping data FD in which a segment region SAR is set by the region setting unit 422 according to the embodiment. After labeling each cell PXS in the mapping data FD, the region setting unit 422 sets the segment region SAR as illustrated in FIG. 6, for example. The segment region SAR has a shape in which the deterioration monitoring control unit 43 easily performs the deterioration monitoring, and is divided so as to include at least one cell group. When a distance at which the first cell group AR1 and the second cell group AR2 that are a plurality of cell groups are adjacent to each other is short, the region setting unit 422 regards the first cell group AR1 and the second cell group AR2 that are the plurality of cell groups as an integrated performing region of the deterioration monitoring, and sets the segment region SAR including the first cell group AR1 and the second cell group AR2.

A shape in which the deterioration monitoring control unit 43 easily performs the deterioration monitoring is, for example, a shape defined to be a rectangle. Note that although FIG. 6 illustrates an example in which the segment region SAR has a rectangular shape, the shape of the segment region SAR is not limited to the rectangular shape and may be a shape other than the rectangular shape, such as a circular shape or an elliptical shape.

In addition, whether or not the distance at which the first cell group AR1 and the second cell group AR2 that are the plurality of cell groups are adjacent to each other is short is determined by determining whether or not the first cell group AR1 and the second cell group AR2 that are the plurality of cell groups are separated by a predetermined number of cells. In addition, whether or not the first cell group AR1 and the second cell group AR2 that are the plurality of cell groups are separated from each other by the predetermined number of cells (the number of pixels) is determined by determining whether or not the first cell group AR1 and the second cell group AR2 are separated from each other by the number of cells (the number of pixels) in which a margin region MAR, which will be described later with reference to FIG. 7 is set.

Here, as an example, the segment region SAR is set to have a rectangular shape, and as the margin region MAR (see FIG. 7), which will be described later, two cells PXS (two pixels PX) are set in each of two directions of the positive X direction and the negative X direction, and two cells PXS (two pixels PX) are set in each of two directions of the positive Y direction and the negative Y direction.

First, in a case where the region setting unit 422 defines a segment line SL for defining the segment region SAR so as to surround the periphery of the first cell group AR1 and to include the first cell group AR1, when it is assumed that the segment line SL having a rectangular shape is defined so as to be adjacent to the outer sides of a cell PXSX10 having the smallest X-coordinate, a cell PXSX11 having the largest X-coordinate, a cell PXSY10 having the smallest Y-coordinate, and a cell PXSY11 having the largest Y-coordinate among the plurality of cells PXS included in the first cell group AR1, the region setting unit 422 determines whether or not the defined segment line SL does not pass through the inside of the second cell group AR2, which is the other cell group among the plurality of cell groups. When the region setting unit 422 determines that the defined segment line SL does not pass through the inside of the second cell group AR2, the region setting unit 422 further determines whether or not another cell group is included within two cells PXS (two pixels PX) on each of the outer sides in the X direction and the Y direction set as the margin region MAR (see FIG. 7). Then, when the region setting unit 422 determines that another cell group is not included, the region setting unit 422 fixes the assumed segment line SL. When the region setting unit 422 determines that another cell group is included, the region setting unit 422 assumes definition of the segment line SL so as to include another cell group.

In the example illustrated in FIG. 6, since the assumed segment line SL passes through the inside of the second cell group AR2, next, when it is assumed that the segment line SL having a rectangular shape is defined so as to be adjacent to the outer sides of the cell PXSX10 having the smallest X-coordinate, a cell PXSY21 having the largest Y-coordinate, a cell PXSX21 having the largest X-coordinate, and the cell PXSY10 having the smallest Y-coordinate among the first cell group AR1 and the second cell group AR2, the region setting unit 422 determines whether or not the defined segment line SL passes through another cell group among the plurality of cell groups.

In the example illustrated in FIG. 6, since the assumed segment line SL does not pass through another cell group among the plurality of cell groups, next, the region setting unit 422 determines whether or not another cell group is included within two cells PXS (two pixels PX) from the assumed segment line SL on each of the outer sides of the assumed segment line SL in the X direction and the Y direction, these cells being set as the margin region MAR (see FIG. 7). When another cell is included, the region setting unit 422 assumes that the segment line SL is defined so as to include another cell group.

In the example illustrated in FIG. 6, since another cell group is not included within two cells PXS (two pixels PX) from the assumed segment line SL on each of the outer sides of the assumed segment line SL in the positive X direction and the positive Y direction, these cells being set as the margin region MAR (see FIG. 7), and another cell group is not included within two cells PXS (two pixels PX) from the assumed segment line SL on each of the outer sides of the assumed segment line SL in the negative X direction and the negative Y direction, the assumed segment line SL is fixed. That is, the region setting unit 422 sets the segment line SL having a rectangular shape so as to include the first cell group AR1 and the second cell group AR2 and to be adjacent to the outer side of each of the cell PXSY21 having the largest Y-coordinate, the cell PXSX21 having the largest X-coordinate, the cell PXSY10 having the smallest Y-coordinate, and the cell PXSX10 having the smallest X-coordinate among the first cell group AR1 and the second cell group AR2.

In this way, the region setting unit 422 defines the segment region SAR that is a region divided (surrounded) by the segment line SL. In addition to the first cell group AR1 and the second cell group AR2 that are in burn-in regions, an adjacent cell group ARZ that is not in a burn-in region and that is adjacent to the periphery of the first cell group AR1 and the periphery of the second cell group AR2 is included in the segment region SAR. The adjacent cell group ARZ includes a plurality of cells PXS (a plurality of cells PXS each of which is added with the labeling numerical value “0”) corresponding to the plurality of pixels PX for which the high-speed monitoring control unit 421 has determined that the decrease amounts of the current-voltage characteristics are within the allowable range.

However, as will be described in detail later, the plurality of cells PXS (that is, the corresponding plurality of pixels PX) in the segment region SAR are subjected to the deterioration monitoring not only for the plurality of cells PXS (that is, the corresponding plurality of pixels PX) included in the first cell group AR1 and the second cell group AR2 but also for the plurality of cell groups PXS (that is, the plurality of corresponding pixels PX) included in the adjacent cell group ARZ.

As described above, the region setting unit 422 sets the segment region SAR in the mapping data FD, so that a shape of a region in which the deterioration monitoring control unit 43 performs the deterioration monitoring can be a shape in which the deterioration monitoring is easily performed (in other words, a shape in which the plurality of pixels PX can be efficiently scanned). This makes it possible to reduce a processing time period of the deterioration monitoring and a load caused by the processing of the deterioration monitoring. In addition, the region setting unit 422 can integrate a plurality of cell groups (for example, the first cell group AR1 and the second cell group AR2) closer than a predetermined distance into one region in which the deterioration monitoring is to be performed by setting the segment region SAR in the mapping data FD. As a result, the number of regions in which the deterioration monitoring control unit 43 performs the deterioration monitoring can be reduced as compared with a case where a large number of regions are discretely distributed. This also makes it possible to reduce the processing time period of the deterioration monitoring and the load caused by the processing of the deterioration monitoring.

Moreover, in addition to the first cell group AR1 and the second cell group AR2 in which the decrease amounts of the current-voltage characteristics are out of the allowable range, that is, that are burn-in regions in which the decrease amounts of the current-voltage characteristics are relatively advanced, the deterioration monitoring is also performed on the adjacent cell group ARZ that is adjacent to the first cell group AR1 and the second cell group AR2 and that is divided by the segment region SAR, which updates the compensation values CM. This makes it possible to prevent a step in level between brightnesses of the first cell group AR1 and the second cell group AR2 that are in the burn-in regions, and the adjacent cell group from being generated as compared with a case where only a cell group that is in a burn-in region is subjected to the deterioration monitoring and the compensation values are updated. As a result, display quality deterioration caused by the deterioration monitoring can be suppressed.

FIG. 7 is a diagram illustrating an example of the mapping data FD in which the margin region MAR is set by the region setting unit 422 according to the embodiment. After setting the segment region SAR in the mapping data FD, the region setting unit 422 sets the margin region MAR as illustrated in FIG. 7, for example. The margin region MAR and the segment region SAR are regions where the deterioration monitoring control unit 43 performs the deterioration monitoring. The margin region MAR is a region that can be caused to function as a reference region for suppressing a step in level between brightnesses of a region (the margin region MAR and the segment region SAR) where the deterioration monitoring control unit 43 performs the deterioration monitoring and a peripheral region around the region in the mapping data FD.

Here, it is assumed that a predetermined number of cells to be set as the margin region MAR surrounding the periphery of the segment region SAR is set in advance. Here, as an example, it is assumed that the number of cells is set to two cells PXS (two pixels PX) in the positive X direction, two cells PXS (two pixels PX) in the negative X direction, two cells PXS (two pixels PX) in the positive Y direction, and two cells PXS (two pixels PX) in the negative Y direction as the margin region MAR. Thus, after setting the segment region SAR, the region setting unit 422 defines a segment line ML for defining a region as the margin region MAR such that the region includes two cells in each of the positive and negative X directions and the positive and negative Y directions on the outer sides from the segment line SL. Thus, the region setting unit 422 sets the margin region MAR that surrounds the adjacent periphery of the segment region SAR in a frame shape and that includes the predetermined number of cells (two cells). As a result, the region setting unit 422 sets the focused monitoring region FAR including the margin region MAR and the segment region SAR. The focused monitoring region FAR is a region for defining some of the plurality of pixels PX on which the deterioration monitoring is to be performed among the plurality of pixels PX provided in the display region 11.

Since the margin region MAR is a region set adjacent to the outer sides of the segment region SAR including the first cell group AR1 and the second cell group AR2 that are in the burn-in regions, similarly to the adjacent cell group ARZ, the margin region MAR is a region that is adjacent to the first cell group AR1 and the second cell group AR2 that are in the burn-in regions and that includes the plurality of cells PXS (the plurality of cells PXS each of which is added with the labeling numerical value “0”) corresponding to the plurality of pixels PX determined by the high-speed monitoring control unit 421 that the decrease amounts of the current-voltage characteristics are within the allowable range.

Thereafter, the region setting unit 422 instructs the deterioration monitoring control unit 43 to perform the deterioration monitoring of the respective pixels PX corresponding to each of the cells PXS in the set focused monitoring region FAR. Note that when the number of cells (the number of pixels) in the set focused monitoring region FAR exceeds the predetermined number, the region setting unit 422 may instruct the deterioration monitoring control unit 43 to perform the deterioration monitoring on all the plurality of pixels PX provided in the display region 11.

Figure 8:
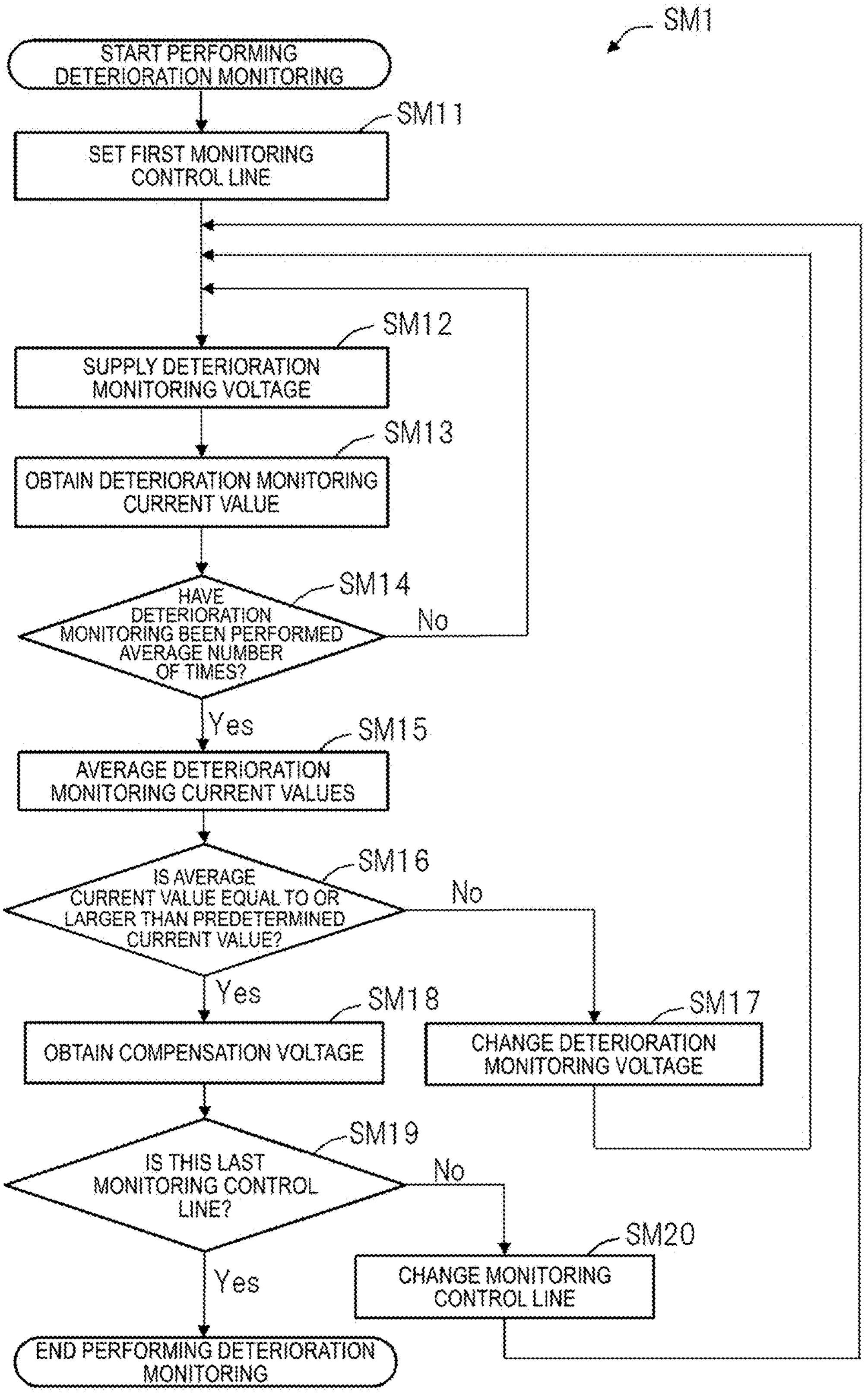
FIG. 8 is a diagram schematically illustrating a procedure of steps of performing deterioration monitoring that is performed by a deterioration monitoring control unit according to the embodiment.

Next, with reference to FIG. 2 and FIG. 8, a procedure of a process in which the deterioration monitoring control unit 43 performs the deterioration monitoring according to the embodiment will be described. FIG. 8 is a diagram schematically illustrating a procedure of step SM1 in which the deterioration monitoring control unit 43 performs the deterioration monitoring according to the embodiment.

As described above, when the region setting unit 422 sets the focused monitoring region FAR (see FIG. 7) and the deterioration monitoring control unit 43 obtains the instruction of performing the deterioration monitoring, the deterioration monitoring control unit 43 first sets the first monitoring control line G2 for starting the deterioration monitoring in step SM11. For example, the deterioration monitoring control unit 43 sets, among the plurality of monitoring control lines G2, the monitoring control line G2 positioned corresponding to the smallest value of X-coordinate in the focused monitoring region FAR as the first monitoring control line G2 to start the deterioration monitoring.

Next, in step SM12, the deterioration monitoring control unit 43 controls the gate line G1 corresponding to the set monitoring control line G2 or the like via the source driver 30, and supplies a deterioration monitoring voltage to the drive transistors Tr2 included in the pixel circuits 20 that are in the focused monitoring region FAR and that are connected to the set monitoring control line G2. The deterioration monitoring voltage before the sweeping that is initially supplied may be set in advance or may be set reflecting the result of the previous deterioration monitoring.

Then, in step SM13, the deterioration monitoring control unit 43 obtains the deterioration monitoring current values MoI that are output currents and that are measured by the measurement unit 31 from the pixel circuits 20 that are in the focused monitoring region FAR and that are connected to the monitoring control line G2 supplied with the deterioration monitoring voltage. As a result, the deterioration monitoring control unit 43 obtains the deterioration monitoring current values MoI from the pixel circuits 20 that are connected to the set monitoring control line G2 and that are in the focused monitoring region FAR.

Next, in step SM14, the deterioration monitoring control unit 43 determines whether or not the deterioration monitoring for the set monitoring control line G2 has been performed an average number of times set in advance per one line. In step SM14, when the deterioration monitoring control unit 43 determines that the deterioration monitoring of the set monitoring control line G2 has not been performed the average number of times set in advance per one line (in the case of NO in step SM14), the processing returns to step SM12. Then, through the processing of steps SM12 and SM13 and the processing in the case where NO is determined in step SM14, the deterioration monitoring control unit 43 supplies the deterioration monitoring voltage to the set monitoring control line G2 and obtains the deterioration monitoring current values MoI for the set monitoring control line G2 the average number of times set in advance per one line.

Then, in step SM14, when the deterioration monitoring control unit 43 determines that the deterioration monitoring for the set monitoring control line G2 has been performed the average number of times set in advance per one line (in the case of YES in step SM14), next, in step SM15, the deterioration monitoring control unit 43 calculates an average of the obtained deterioration monitoring current values MoI for each of the plurality of pixel circuits 20 that are connected to the one set monitoring control line G2 and that are in the focused monitoring region FAR.

Then, in step SM16, the deterioration monitoring control unit 43 determines whether or not the averaged deterioration monitoring current value MoI for each of all the plurality of pixel circuits 20 that are connected to the one set monitoring control line G2 and that are in the focused monitoring region FAR is equal to or larger than a predetermined current value. Note that in step SM16, the deterioration monitoring voltage of the pixel circuit 20, among all the plurality of pixel circuits 20 that are connected to the one set monitoring control line G2 and that are in the focused monitoring region FAR, with the averaged deterioration monitoring current value MoI equal to or larger than the predetermined current value is stored in a temporary line memory or the like as a candidate value for the compensation voltage value CV.

In step SM16, when the deterioration monitoring control unit 43 determines that at least one averaged deterioration monitoring current value MoI for each of all the pixel circuits 20 that are connected to the one set monitoring control line G2 and that are in the focused monitoring region FAR is not equal to or larger than the predetermined current value (in the case of NO in step SM16), in step SM17, the deterioration monitoring control unit 43 changes the deterioration monitoring voltage, that is, sweeps the deterioration monitoring voltage. For example, the deterioration monitoring control unit 43 increases the voltage of the deterioration monitoring voltage. Note that when the voltage of the deterioration monitoring is increased, the candidate value for the compensation voltage value CV stored in the temporary line memory in the pixel circuit 20 with a current value already having been equal to or larger than the predetermined current value is not updated and is held as it is. Next, the processing returns to step SM12, and the deterioration monitoring control unit 43 supplies the deterioration monitoring voltage changed in step SM17 to the drive transistors Tr2 included in the plurality of pixel circuits 20 that are connected to the set monitoring control line G2 and that are in the focused monitoring region FAR, via the source driver 30. Then, the processing of steps SM12 to SM17 for changing the deterioration monitoring voltage, that is, sweeping the deterioration monitoring voltage is repeated until all the averaged deterioration monitoring current values MoI for the respective plurality of pixel circuits 20 that are connected to the one set monitoring control line G2 and that are in the focused monitoring region FAR become equal to or larger than the predetermined current value.

Then, in step SM16, when the deterioration monitoring control unit 43 determines that all the averaged deterioration monitoring current values MoI for the respective plurality of pixel circuits 20 that are connected to the one set monitoring control line G2 and that are in the focused monitoring region FAR are equal to or larger than the predetermined current value (in the case of YES in step SM16), next, in step SM18, the deterioration monitoring control unit 43 stores the candidate values for the compensation voltage values CV stored in the temporary line memory, in the storage unit 50 or the like as the compensation voltage values CV. As a result, the deterioration monitoring control unit 43 obtains the compensation voltage values CV related to the drive transistors Tr2 included in the plurality of pixel circuits 20 that are connected to the set monitoring control line G2 and that are in the focused monitoring region FAR.

Then, in step SM19, the deterioration monitoring control unit 43 determines whether or not the set monitoring control line G2 is the monitoring control line G2 positioned corresponding to the largest value of X-coordinate in the focused monitoring region FAR. In step SM19, when the deterioration monitoring control unit 43 determines that the set monitoring control line G2 is not the monitoring control line G2 positioned corresponding to the largest value of X-coordinate in the focused monitoring region FAR (in the case of NO in step SM19), next, in step SM20, the set monitoring control line G2 is changed by the gate driver 13 selecting the monitoring control line G2 adjacent thereto (specifically the adjacent monitoring control line G2 has the X-coordinate being one larger than that of the set monitoring control line G2), and thus, the set monitoring control line G2 is changed and the processing returns to step SM12. Then, through the processing of steps SM12 to SM18, the processing in the case of NO in step SM19, and the processing of step SM20, the supplying of the deterioration monitoring voltage swept the average number of times and the obtaining of the compensation voltage values CV based on the deterioration monitoring current values MoI from the respective pixel circuits 20 one line by one line in the focused monitoring region FAR are repeated to the last monitoring control line G2.

Then, in step SM19, when the deterioration monitoring control unit 43 determines that the set monitoring control line G2 is the monitoring control line positioned corresponding to the largest value of X-coordinate in the focused monitoring region FAR (in the case of YES in step SM19), the deterioration monitoring control unit 43 ends the deterioration monitoring. Thereafter, the processing proceeds to a process in which the compensation value generation unit 44 obtains the compensation values CM, which will be described with reference to FIG. 9 and subsequent drawings.

In this manner, in the deterioration monitoring, the deterioration monitoring control unit 43 supplies the deterioration monitoring voltage the average number of times to each line of the plurality of monitoring control lines G2 one line by one line in the focused monitoring region FAR and obtains the deterioration monitoring current values MoI the average number of times. Then, the deterioration monitoring control unit 43 repeatedly changes and supplies the deterioration monitoring voltage to each line of the plurality of monitoring control lines G2 one line by one line in the focused monitoring region FAR until the average value of the deterioration monitoring current values MoI of each of the plurality of pixel circuits 20 is equal to or larger than the predetermined current value. Thus, the compensation voltage values CV are obtained in the focused monitoring region FAR for each line of the plurality of monitoring control lines G2 one line by one line.

Note that in the above description, the procedure of the processing when the deterioration monitoring is performed on the focused monitoring region FAR has been described. When the deterioration monitoring is performed on all the plurality of pixels PX provided in the display region 11, processing similar to that described above may be performed on the entire display region 11.

As described above, in the deterioration monitoring, the number of times the voltage is supplied to each of the plurality of monitoring control lines G2, that is, the number of times the decrease amount of the current-voltage characteristic of each of the group of pixels PX is measured, is more than that of the high-speed monitoring. Thus, a time period required from the start to the end of the performing thereof is longer, but the decrease amount of the current-voltage characteristic can be accurately measured.

Next, a process of obtaining the compensation value CM based on the compensation voltage value CV by the compensation value generation unit 44 will be described with reference to FIG. 9 to FIG. 12.

Figure 9:
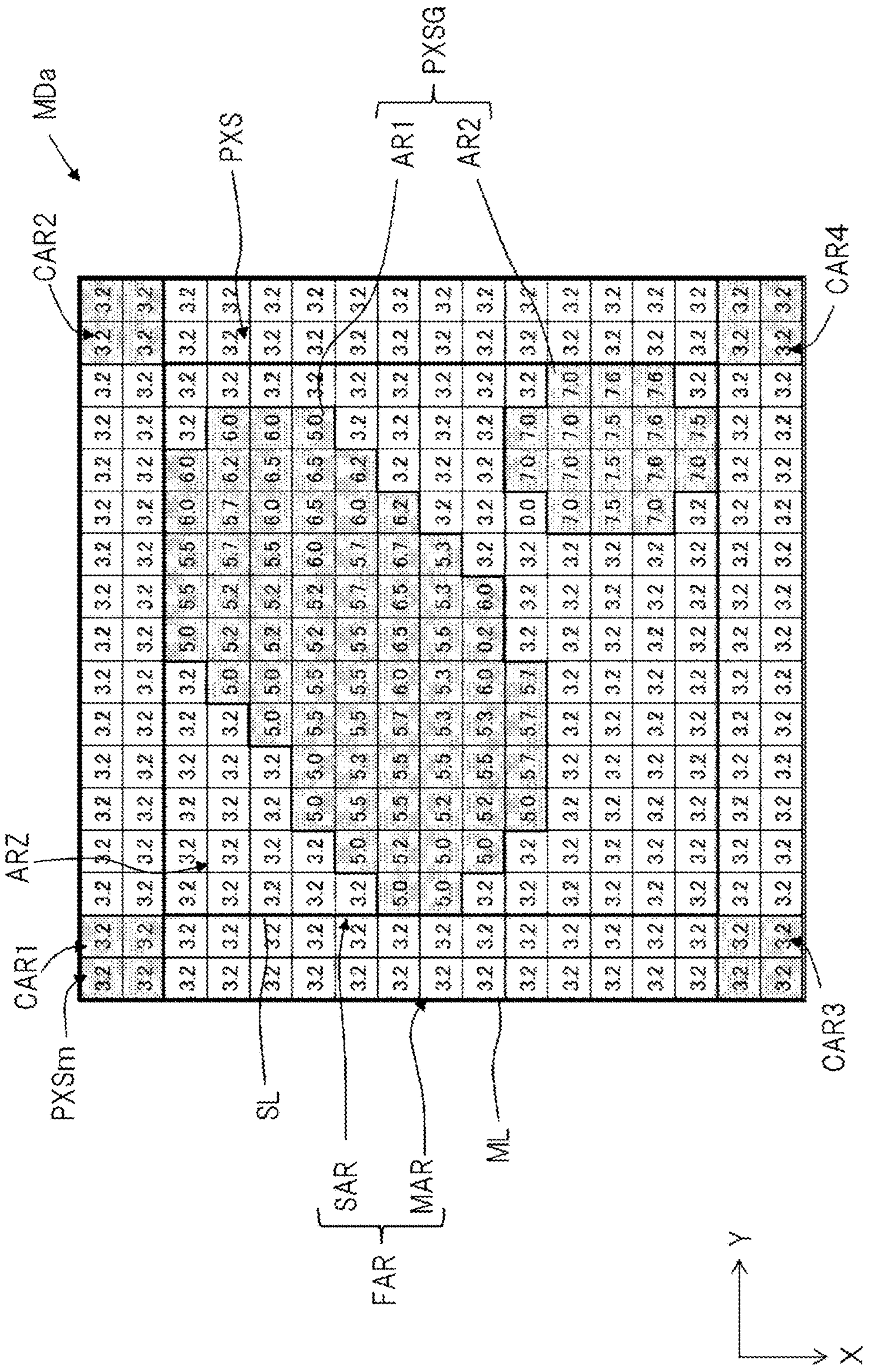
FIG. 9 is a diagram illustrating an example of mapping data in which a compensation value created based on a compensation voltage value obtained by performing deterioration monitoring has been added to each cell according to the embodiment.

FIG. 9 is a diagram illustrating an example of mapping data MDa in which the compensation value CM generated based on the compensation voltage value CV obtained by the deterioration monitoring is added to each cell PXS according to the embodiment. The compensation value generation unit 44 generates the compensation value CM of each pixel PX corresponding to each cell PXS included in the focused monitoring region FAR based on the compensation voltage value CV obtained by the deterioration monitoring control unit 43 performing the deterioration monitoring. Then, the compensation value generation unit 44 creates the mapping data MDa after the performing of the deterioration monitoring, the mapping data MDa being obtained by adding the generated compensation values CM to the respective cells PXS included in the focused monitoring region FAR. The numerical value described in each cell PXS in the mapping data MDa illustrated in FIG. 9 indicates the compensation value CM based on the compensation voltage value CV obtained from each pixel PX corresponding to each cell PXS.

Here, when the deterioration monitoring control unit 43 performs the deterioration monitoring for only some of the plurality of pixels PX provided in the display region 11, that is, only the plurality of pixels PX corresponding to the focused monitoring region FAR, the plurality of pixels PX corresponding to the focused monitoring region FAR and the plurality of pixels PX other than the plurality of pixels PX corresponding to the focused monitoring region FAR are different from each other in timing at which the deterioration monitoring control unit 43 performs the deterioration monitoring, which may differentiate various types of environment such as a temperature of the display panel 10 when the deterioration monitoring is performed. For this reason, inside and outside the focused monitoring region FAR, in addition to the decrease of the current-voltage characteristic caused by the deterioration of the current-voltage characteristic of each of the plurality of pixels PX, an error caused by a difference in the environment and the like of the display panel 10 due to a difference in the timing of performing the deterioration monitoring may be included.

Figure 10:
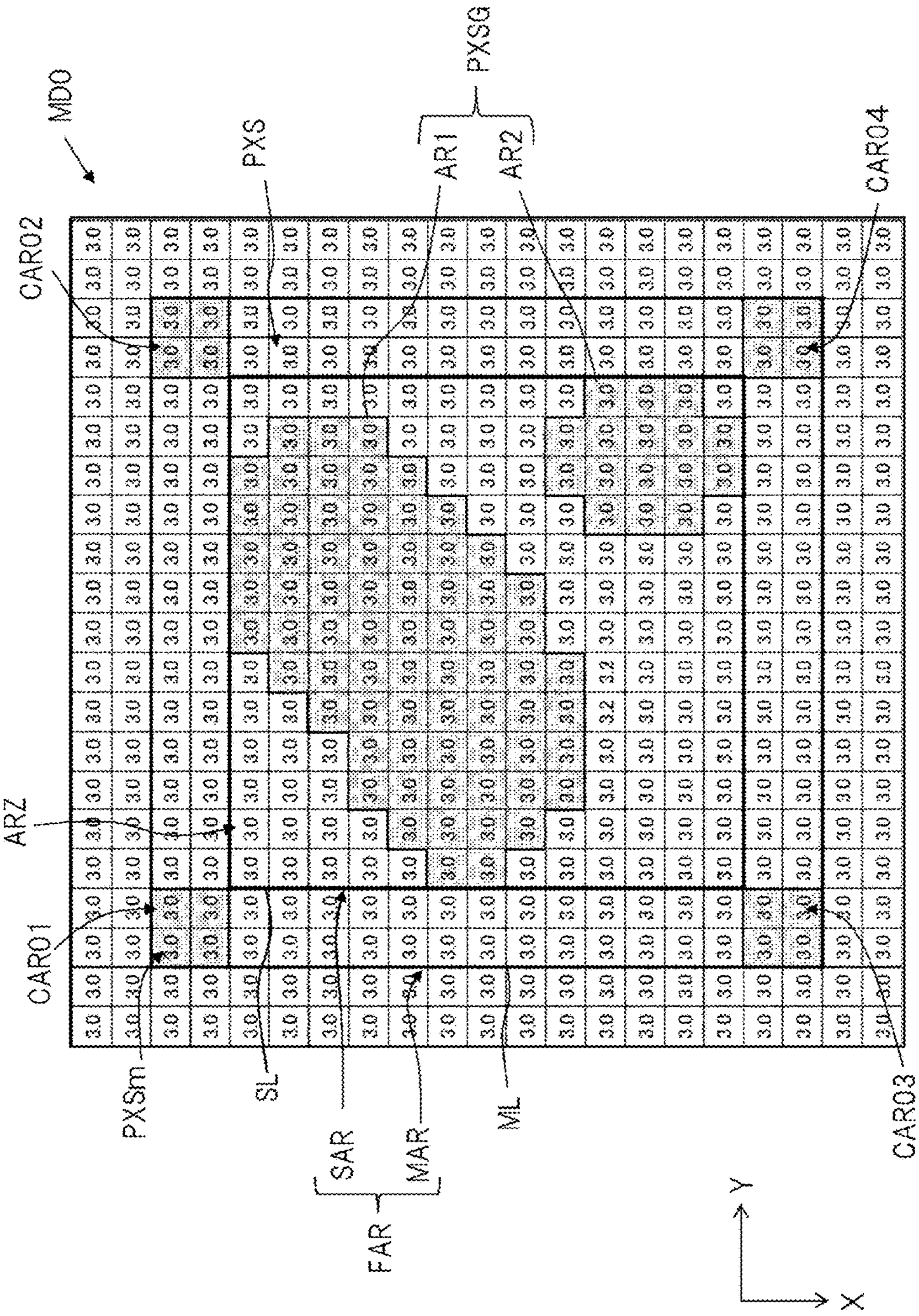
FIG. 10 is a diagram illustrating an example of mapping data in which a compensation value stored in compensation value data of a storage unit has been added to each cell before the mapping data illustrated in FIG. 9 is created.

FIG. 10 is a diagram illustrating an example of the mapping data MDO in which the compensation value CM stored in the compensation value data 51 of the storage unit 50 is added to each cell PXS before the mapping data MDa illustrated in FIG. 9 is created. It is assumed that the mapping data MDa illustrated in FIG. 10 is mapping data created immediately before the mapping data MDa illustrated in FIG. 9 is created.

For example, it is assumed that "3.0" is added as the compensation value CM to all the cells PXS in the mapping data MDO illustrated in FIG. 10. For example, it is assumed that "3.0" is added as the compensation value CM to a cell PXSm at the upper left corner among the plurality of cells PXS included in the margin region MAR in the mapping data MDa in FIG. 10. On the other hand, it is assumed that "3.2" is added as the compensation value CM to the cell PXSm at the upper left corner among the plurality of cells PXS included in the margin region MAR in the mapping data MDa illustrated in FIG. 9, the mapping data MDa being created after the creation of the mapping data MDO illustrated in FIG. 10.

Here, since the margin region MAR is a region outside the segment region SAR including the first cell group AR1 and the second cell group AR2 that are in the burn-in regions, the margin region MAR is not included in a burn-in region but includes the cell group corresponding to the plurality of pixels PX determined by the high-speed monitoring control unit 421 that the decrease amounts of the current-voltage characteristics are within the allowable range. Thus normally the compensation value CM added to the cell PXSm included in the margin region MAR in the mapping data MDa illustrated in FIG. 9 is expected to have a small amount of change from the compensation value CM of "3.0" added to the cell PXSm at the same position included in the margin region MAR in the mapping data MDO illustrated in FIG. 10. However, the compensation value CM of the cell PXSm in the mapping data MDa illustrated in FIG. 9 is not "3.0" but "3.2", which is relatively largely changed. Thus, there is a possibility that the compensation values CM added to the respective cells PXS in the focused monitoring region FAR in the mapping data MDa illustrated in FIG. 9 are entirely shifted compared with those at the time of the creation of the mapping data MDO illustrated in FIG. 10. The reason for this shift is considered to be, for example, the fact that although the decrease amount of the current-voltage characteristic of the pixel PX included in the margin region MAR is within the allowable range, the decrease amount of the current-voltage characteristic is not 0. In addition, for example, as described above, it is considered that an error caused by a difference in the environment of the display panel 10 or the like due to a difference between the timing at which the deterioration monitoring is performed when the mapping data MDa illustrated in FIG. 9 is created and the timing at which the deterioration monitoring is performed when the mapping data MDO illustrated in FIG. 10 is created is included.

Thus, when the deterioration monitoring control unit 43 performs the deterioration monitoring on some pixels PX among all the pixels PX included in the display region 11, the deterioration monitoring control unit 43 corrects (that is, adjusts) the compensation values CM added to the plurality of cells PXS included in the focused monitoring region FAR in the mapping data MDa so as to approach the compensation values CM indicated by the compensation value data 51 stored in the storage unit 50 by using the compensation values CM added to the plurality of cells PXS included in the margin region MAR.

As illustrated in FIG. 9, after adding the compensation value CM to each cell PXS, the compensation value generation unit 44 sets a plurality of correction coefficient adjustment regions CAR1 to CAR4 separated from each other in the margin region MAR. In the example illustrated in FIG. 9, since the margin region MAR is rectangular, for example, the compensation value generation unit 44 sets the correction coefficient adjustment regions CAR1 to CAR4 at four corners of the margin region MAR. In the margin region MAR, the upper left corner is the correction coefficient adjustment region CAR1, the upper right corner is the correction coefficient adjustment region CAR2, the lower left corner is the correction coefficient adjustment region CAR3, and the lower right corner is the correction coefficient adjustment region CAR4. Four cells PXS are included in each of the correction coefficient adjustment regions CAR1 to CAR4.

Next, the compensation value generation unit 44 creates an average value (Vc) of the compensation values CM added to the plurality of cells PXS for each of the correction coefficient adjustment regions CAR1 to CAR4. In the example illustrated in FIG. 9, the average values (Vc) of the compensation values CM in the correction coefficient adjustment regions CAR1 to CAR4 are all "3.2".

Next, the compensation value generation unit 44 refers to the compensation value data 51 stored in the storage unit 50, and generates an average value (Vm) of the compensation values CM for each of correction coefficient adjustment regions CAR01 to CAR04 (see FIG. 10) at positions corresponding to the correction coefficient adjustment regions CAR1 to CAR4 illustrated in FIG. 9. In the example illustrated in FIG. 10, the correction coefficient adjustment region CAR01 is at the upper left corner of the margin region MAR similarly to the correction coefficient adjustment region CAR1 (see FIG. 9), the correction coefficient adjustment region CAR02 is at the upper right corner of the margin region MAR similarly to the correction coefficient adjustment region CAR2 (see FIG. 9), the correction coefficient adjustment region CAR03 is at the lower left corner of the margin region MAR similarly to the correction coefficient adjustment region CAR3 (see FIG. 9), and the correction coefficient adjustment region CAR04 is at the lower right corner of the margin region MAR similarly to the correction coefficient adjustment region CAR4 (see FIG. 9). Four cells PXS are included in each of the correction coefficient adjustment regions CAR01 to CAR04. In the example illustrated in FIG. 10, the average values (Vm) of the compensation values CM in the correction coefficient adjustment regions CAR01 to CAR04 are all "3.0".

Next, the compensation value generation unit 44 calculates correction coefficients Vcoef by using the following (Equation 1).

$$\text{Vcoef} = Vm/Vc \quad \text{(Equation 1)}$$

Then, the compensation value generation unit 44 corrects the compensation value CM added to each cell PXS in the focused monitoring region FAR illustrated in FIG. 9 by multiplying the compensation value CM by the correction coefficient Vcoef. Then, the corrected compensation value CM obtained by the correction is added to each cell PXS in the focused monitoring region FAR.

Figure 11:
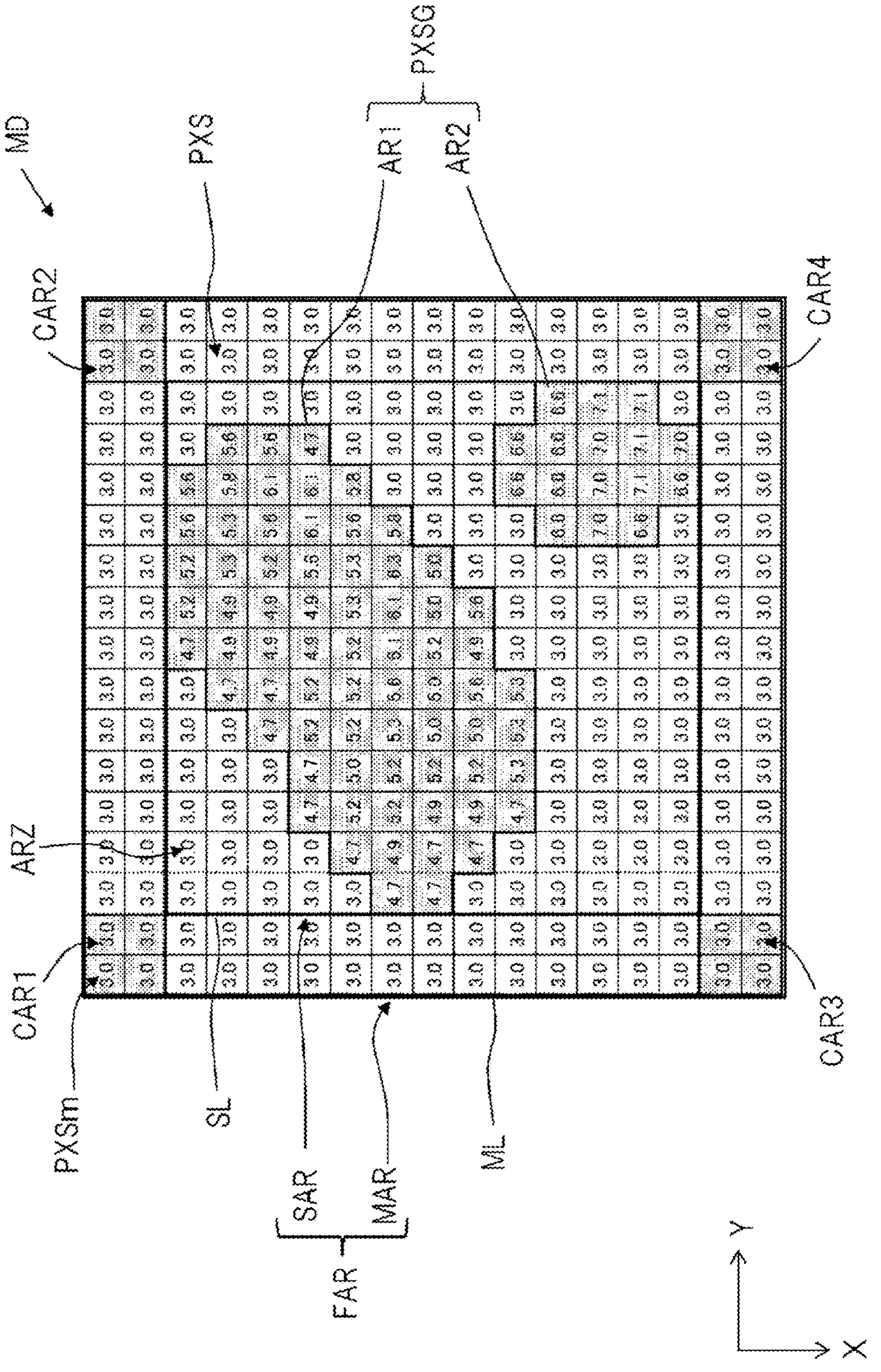
FIG. 11 is a diagram illustrating an example of mapping data in which a compensation value corrected by using a correction coefficient has been added to each cell according to the embodiment.

FIG. 11 is a diagram illustrating an example of the mapping data MD in which the compensation value CM corrected by using the correction coefficient is added to each cell PXS according to the embodiment. The compensation value generation unit 44 corrects each compensation value CM added to the mapping data MDa illustrated in FIG. 9 by using the correction coefficient Vcoef shown in (Equation 1) described above, and creates the mapping data MD including the plurality of cells PXS to which the compensation values CM after the correction are added as illustrated in FIG. 11. Then, the compensation value generation unit 44 updates each of the plurality of cells PXS (that is, each of the plurality of pixels PX) on which the deterioration monitoring is performed, the plurality of cells PXS being indicated by the compensation value data 51 stored in the storage unit 50, by using the corrected compensation value CM for each of the plurality of cells PXS.

Note that after calculating the correction coefficients Vcoef, the compensation value generation unit 44 may perform correction by linearly interpolating the compensation values CM associated with the respective plurality of cells PXS in the focused monitoring region FAR by using the correction coefficient adjustment regions CAR1 to CAR4.

Figure 12:
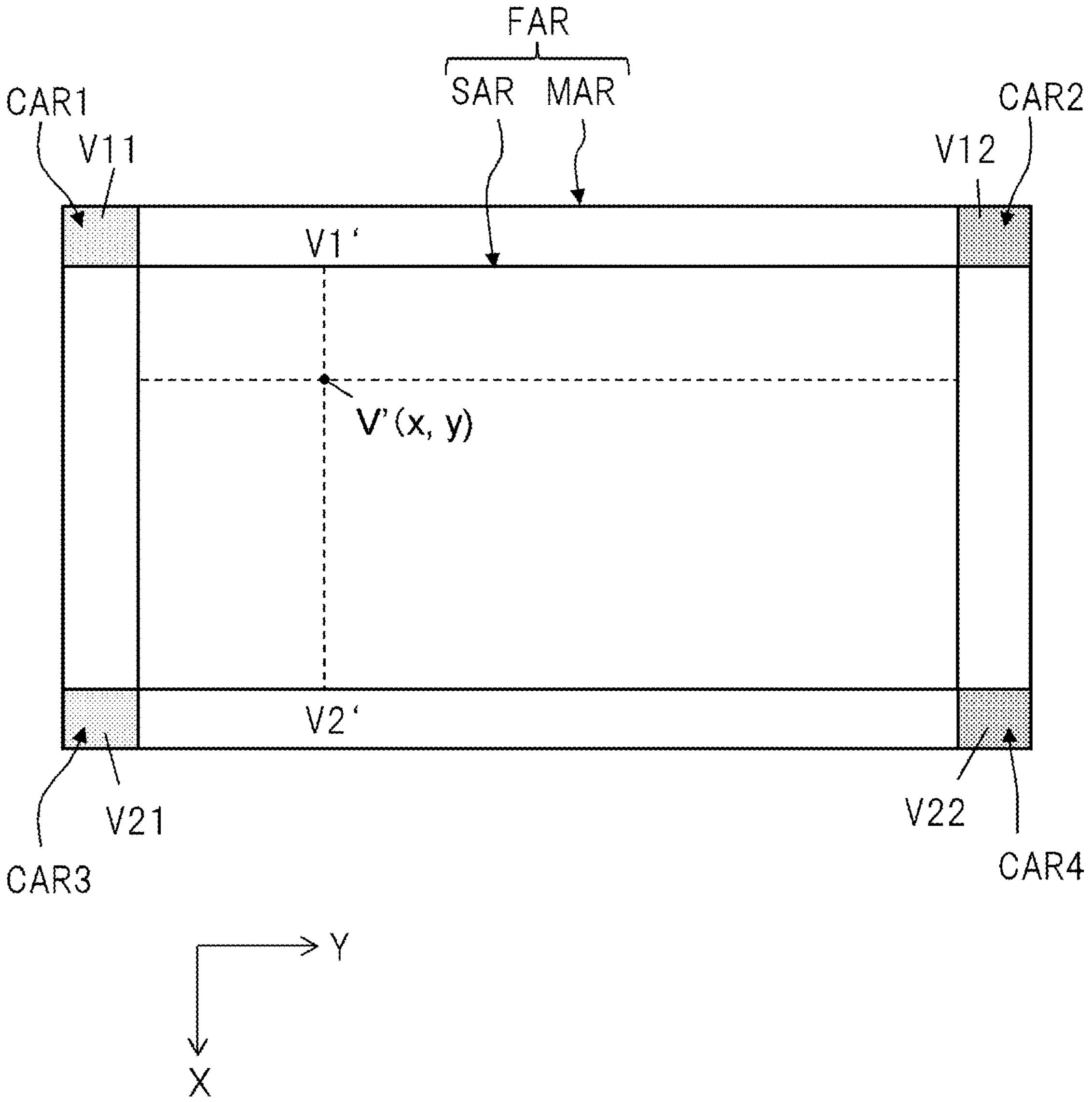
FIG. 12 is a diagram for describing a coefficient for linear interpolation performed by a compensation value generation unit according to the embodiment.

FIG. 12 is a diagram for describing coefficients for performing the linear interpolation by the compensation value generation unit 44 according to the embodiment. For example, in the mapping data MDa illustrated in FIG. 9, the correction coefficient (Vcoef) calculated based on the average value (Vc) of the compensation values CM associated with the plurality of cells PXS included in the correction coefficient adjustment region CAR1 and the average value (Vm) of the compensation values CM stored in the compensation value data 51 is defined as V11, the correction coefficient (Vcoef) calculated based on the average value (Vc) of the compensation values CM associated with the plurality of cells PXS included in the correction coefficient adjustment region CAR2 and the average value (Vm) of the compensation values CM stored in the compensation value data 51 is defined as V12, the correction coefficient (Vcoef) calculated based on the average value (Vc) of the compensation values CM associated with the plurality of cells PXS included in the correction coefficient adjustment region CAR3 and the average value (Vm) of the compensation values CM stored in the compensation value data 51 is defined as V21, and the correction coefficient (Vcoef) calculated based on the average value (Vc) of the compensation values CM associated with the plurality of cells PXS included in the correction coefficient adjustment region CAR4 and the average value (Vm) of the compensation values CM stored in the compensation value data 51 is defined as V22. Then, the correction coefficient V1' is calculated as shown in the following (Equation 2), the correction coefficient V2' is calculated as shown in the following (Equation 3), and the correction coefficient V' is calculated as shown in the following (Equation 4). Note that x, x1, and x2 indicate X-coordinates of the cells PXS in the focused monitoring region FAR, and y, y1, and y2 indicate Y-coordinates of the cells PXS in the focused monitoring region FAR.

$$V1' = (V12 - V11)\times\big((y-y1)/(y2-y1)\big) + V11 \quad \text{(Equation 2)}$$

$$V2' = (V22 - V21)\times\big((y-y1)/(y2-y1)\big) + V21 \quad \text{(Equation 3)}$$

$$V'(x, y) = (V2' - V1')\times\big((x-x1)/(x-x1)\big) + V1' \quad \text{(Equation 4)}$$

The compensation value generation unit 44 may obtain the compensation value CM after the correction by multiplying the compensation value CM (correction value before the correction) added to each cell PXS of the mapping data MDa illustrated in FIG. 9 by the correction coefficient V' shown in the above-described (Equation 4). Then, the compensation value generation unit 44 may create the mapping data MD including the plurality of cells PXS to which the compensation values CM after the correction are added as illustrated in FIG. 11. Then, the compensation value generation unit 44 may update each of the plurality of cells PXS (that is, each of the plurality of pixels PX) on which the deterioration monitoring is performed, the plurality of cells PXS being indicated by the compensation value data 51 stored in the storage unit 50, by using the corrected compensation value CM for each of the plurality of cells PXS.

As described above, the compensation value generation unit 44 linearly interpolates the compensation value CM added to each cell PXS in the focused monitoring region FAR, thereby equalizing errors included in the compensation values CM added to the respective cells PXS in the focused monitoring region FAR even when the errors are obliquely added to the compensation values CM added to the respective cells PXS in the focused monitoring region FAR in at least one of the X direction or the Y direction. This makes it possible to perform deterioration compensation with higher accuracy.

Figure 13:
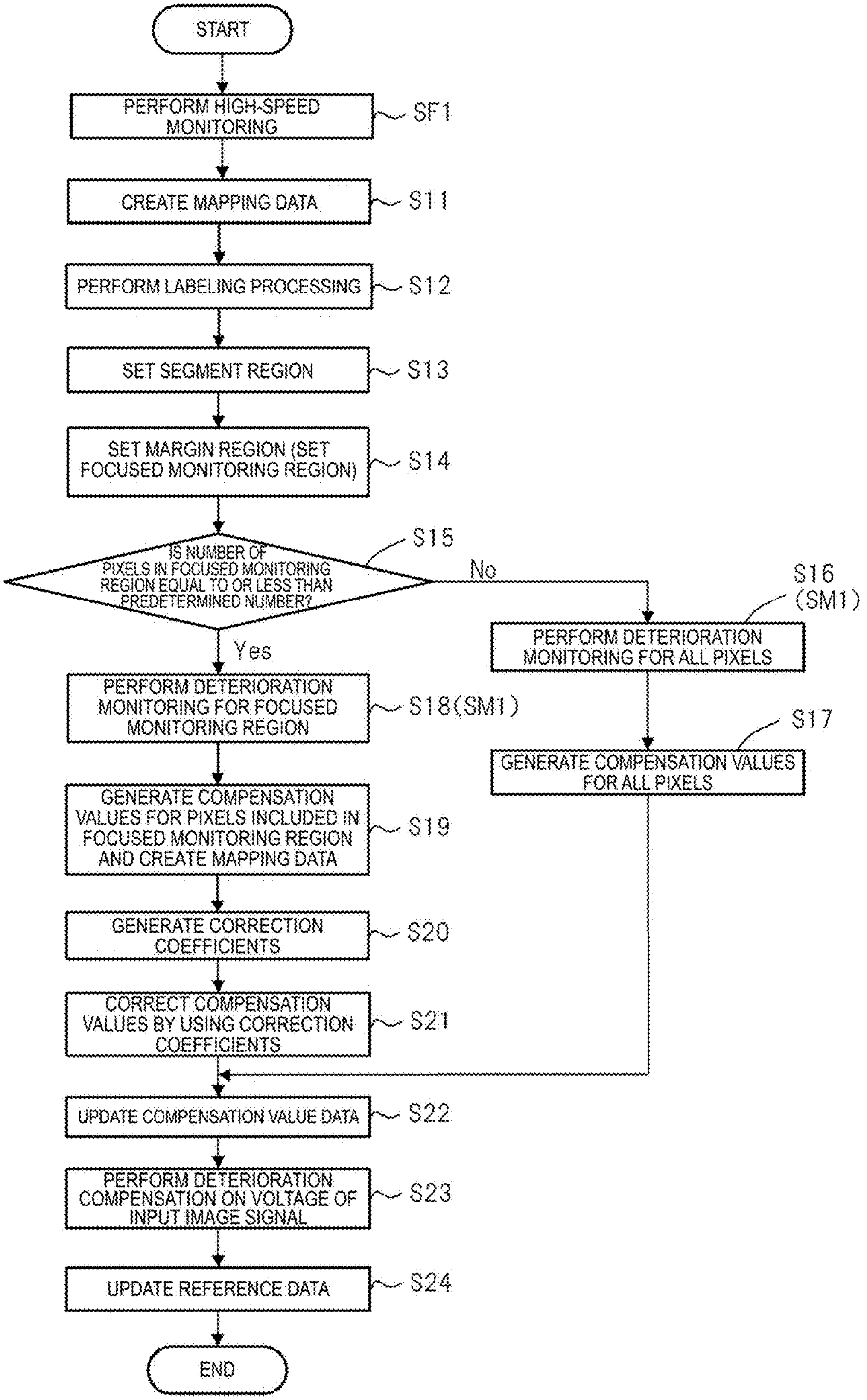
FIG. 13 is a diagram illustrating a procedure of processing of a control unit according to the embodiment.

Next, a procedure of processing of the control unit 40 according to the embodiment will be described with reference to FIG. 13. FIG. 13 is a diagram illustrating the procedure of the processing of the control unit 40 according to the embodiment.

First, in step SF1, the high-speed monitoring control unit 421 performs the high-speed monitoring by the processing described with reference to FIG. 3. Accordingly, the high-speed monitoring control unit 421 specifies positions of the plurality of pixels PX in which differences between the high-speed monitoring current values FMoI and the reference values in the reference data 52 exceed the predetermined range, that is, the decrease amounts of the current-voltage characteristics are out of the allowable range, among the plurality of pixels PX provided in the display region 11.

Next, in step S11, the region setting unit 422 creates the mapping data FD (see FIG. 4) in which the positions of the plurality of pixels PX specified by the high-speed monitoring control unit 421 that the decrease amounts of the current-voltage characteristics are out of the allowable range are mapped. For example, the region setting unit 422 creates the mapping data FD by mapping the plurality of cells PXS corresponding to the plurality of pixels PX specified by the high-speed monitoring control unit 421 that the decrease amounts of the current-voltage characteristics are out of the allowable range and the plurality of cells PXS corresponding to the plurality of pixels PX specified by the high-speed monitoring control unit 421 that the decrease amounts of the current-voltage characteristics are within the allowable range.

Next, in step S12, the region setting unit 422 sequentially labels the plurality of cells PXS constituting the mapping data FD, thereby creating the mapping data FD (FIG. 5) in which the identification information is added to each cell PXS. The region setting unit 422 labels each of the plurality of pixels PX provided in the display region 11 by sequentially labeling the plurality of cells PXS constituting the mapping data FD. That is, for the respective plurality of cells PXS constituting the mapping data FD, the region setting unit 422 adds mutually different types of identification information to the plurality of cells PXS corresponding to the plurality of pixels PX specified by the high-speed monitoring control unit 421 that the decrease amounts of the current-voltage characteristics are within the allowable range, and the group of cells PXSG corresponding to the group of pixels specified by the high-speed monitoring control unit 421 that the decrease amounts of the current-voltage characteristics are out of the allowable range. In addition, when the group of cells PXSG includes the first cell group AR1 and the second cell group AR2 that are a plurality of cell groups separated from each other, the region setting unit 422 also adds mutually different types of identification information to the plurality of cells PXS included in the first cell group AR1 and the plurality of cells PXS included in the second cell group AR2.

Next, in step S13, the region setting unit 422 sets the segment region SAR (see FIG. 6) so as to surround the group of cells PXSG. When the region setting unit 422 determines whether an adjacent distance between the first cell group AR1 and the second cell group AR2 that are separated from each other is short or not because the first cell group AR1 and the second cell group AR2 that are the plurality of cell groups separated from each other are present in the group of cells PXSG in the mapping data FD. When the region setting unit 422 determines that the distance from each other is short, the region setting unit 422 sets the segment region SAR (see FIG. 6) by defining the segment line SL (see FIG. 6) surrounding the periphery of the first cell group AR1 and the second cell group AR2 so as to include the first cell group AR1 and the second cell group AR2. For example, when the first cell group AR1 and the second cell group AR2 are separated from each other by the number of cells (the number of pixels) set as the margin region MAR (see FIG. 7), the region setting unit 422 may determine that the adjacent distance between the first cell group AR1 and the second cell group AR2 is far. When the first cell group AR1 and the second cell group AR2 are not separated from each other by the number of cells (the number of pixels) set as the margin region MAR (see FIG. 7), the region setting unit 422 may determine that the adjacent distance to each other is short. In addition, the region setting unit 422 preferably sets the segment region SAR such that the segment region SAR has a rectangular shape from the viewpoint of ease of performing the deterioration monitoring, but the shape of the segment region SAR is not limited to a rectangular shape and may be another shape.

Next, in step S14, the region setting unit 422 sets the margin region MAR (see FIG. 7). In this way, the region setting unit 422 sets the focused monitoring region FAR (see FIG. 7) including the segment region SAR and the margin region MAR. For example, the region setting unit 422 sets the margin region MAR (see FIG. 7) by defining the segment line ML (see FIG. 7) so as to surround the periphery of the segment region SAR in a frame shape and to include a predetermined number of cells set in advance. Since the margin region MAR is a region having the frame shape and surrounding the periphery of the segment region SAR, an outer shape of the margin region MAR is a shape along an outer shape of the segment region SAR. For example, in the example illustrated in FIG. 7, since the segment region SAR has a rectangular shape, an outer shape of the margin region MAR is also a rectangular shape.

Next, in step S15, the region setting unit 422 determines whether or not the number of pixels (that is, the number of cells) included in the focused monitoring region FAR (see FIG. 7) is equal to or less than a predetermined number. For example, the deterioration monitoring control unit 43 counts the number of the plurality of cells PXS (that is, the number of the plurality of pixels PX) included in the focused monitoring region FAR, and determines whether or not the number of the plurality of cells PXS (that is, the number of the plurality of pixels PX) included in the focused monitoring region FAR is equal to or less than the predetermined number.

In step S15, when the region setting unit 422 determines that the number of pixels in the focused monitoring region FAR (see FIG. 7) exceeds the predetermined number (in the case of NO in step S15), since it can be determined that a rate of the display region 11 occupied by the focused monitoring region FAR is large, next, in step S16, the region setting unit 422 instructs the deterioration monitoring control unit 43 to perform the deterioration monitoring on all the pixels PX provided in the display region 11. Thus, the deterioration monitoring control unit 43 performs the deterioration monitoring on all the plurality of pixels PX, and obtains the compensation voltage values CV of all the plurality of pixels PX. In step S16, the deterioration monitoring control unit 43 performs step SM of performing the deterioration monitoring described with reference to FIG. 8 on all the plurality of pixels PX provided in the display region 11.

Next, in step S17, the compensation value generation unit 44 generates the compensation values CM of all the pixels PX based on the compensation voltage values CV of all the pixels PX obtained by the deterioration monitoring control unit 43 performing the deterioration monitoring. In this way, when the number of pixels in the focused monitoring region FAR exceeds the predetermined number, the deterioration monitoring of all of the plurality of pixels PX provided in the display region 11 is performed, thereby making it possible to suppress occurrence of a step in level of the compensation values CM between most of the plurality of pixels PX included in the focused monitoring region FAR and a small number of the plurality of pixels PX not included in the focused monitoring region FAR. After step S17, the processing proceeds to step S22, which will be described later.

In step S15, when the region setting unit 422 determines that the number of pixels in the focused monitoring region FAR (see FIG. 7) is equal to or less than the predetermined number (in the case of YES in step S15), next, in step S18, the region setting unit 422 instructs the deterioration monitoring control unit 43 to perform the deterioration monitoring on the plurality of pixels PX included in the focused monitoring region FAR. Thus, the deterioration monitoring control unit 43 performs the deterioration monitoring on the plurality of pixels PX included in the focused monitoring region FAR (the plurality of pixels PX corresponding to the plurality of cells PXS constituting the focused monitoring region FAR). At this time, the plurality of pixels to be subjected to the deterioration monitoring are some of all the pixels PX provided in the display region 11. In step S18, the deterioration monitoring control unit 43 performs step SM of performing the deterioration monitoring described with reference to FIG. 8 only on the plurality of pixels PX included in the focused monitoring region FAR. Thus, the deterioration monitoring control unit 43 obtains the compensation voltage value CV from each of the plurality of pixels PX that are included in the focused monitoring region FAR and that are some of all the pixels PX provided in the display region 11.

Next, in step S19, the compensation value generation unit 44 generates the compensation value CM for each of the plurality of pixels PX included in the focused monitoring region FAR based on the compensation voltage value CV obtained by the deterioration monitoring control unit 43 performing the deterioration monitoring, and generates the mapping data MDa (see FIG. 9) after the deterioration monitoring by adding the generated compensation value CM to each of the plurality of pixels PX included in the focused monitoring region FAR.

Next, in step S20, the compensation value generation unit 44 generates the correction coefficient Vcoef for correcting the compensation value CM based on the margin region MAR (see FIG. 9) in the mapping data MDa and the compensation value data 51 stored in the storage unit 50. For example, the compensation value generation unit 44 sets a plurality of correction coefficient adjustment regions CAR1 to CAR4 (see FIG. 9) in the margin region MAR (see FIG. 9) in the mapping data MDa, and creates the correction coefficients Vcoef based on the set correction coefficient adjustment regions CAR1 to CAR4 and the correction coefficient adjustment regions CAR01 to CAR04 (see FIG. 10) corresponding to the correction coefficient adjustment regions CAR1 to CAR4 in the compensation value data 51 stored in the storage unit 50. The correction coefficient Vcoef may be calculated by (Equation 1) as described above, for example.

Next, in step S21, the compensation value generation unit 44 corrects each compensation value CM added to the mapping data MDa (see FIG. 9) by using the correction coefficient Vcoef shown in the above-described (Equation 1). Accordingly, the compensation value generation unit 44 generates the compensation value CM after the correction for each of the plurality of pixels PX included in the focused monitoring region FAR, and generates the mapping data MD (see FIG. 11) including the plurality of cells PXS that are included in the focused monitoring region FAR and that are added with the compensation values CM after the correction.

Note that when the compensation values CM after the correction are generated, the compensation value generation unit 44 may further generate the compensation values CM after the correction by performing linear interpolation on the inside of the focused monitoring region FAR by using the correction coefficients V1', V2', V' calculated as illustrated in FIG. 12 by using the above-described (Equation 2) to (Equation 4) and thus, may create the mapping data MD (see FIG. 11) including the plurality of cells PXS that are included in the focused monitoring region FAR and that are added with the compensation values CM after the correction.

Next, in step S22, the compensation value generation unit 44 updates, for each pixel PX for which the compensation value CM has been generated, the compensation values CM stored in the storage unit 50 as the compensation value data 51 by using the generated compensation values CM. For example, when the compensation values CM of all the pixels PX are generated by performing the deterioration monitoring of all the pixels PX provided in the display region 11 through determination of NO in step S15, step S16, and step S17, the compensation value generation unit 44 updates the compensation values CM of all the pixels PX stored as the compensation value data 51 in the storage unit 50. On the other hand, for example, when the compensation value generation unit 44 generates the compensation values CM of only the plurality of pixels PX included in the focused monitoring region FAR by performing the deterioration monitoring of only the plurality of pixels PX included in the focused monitoring region FAR through determination of YES in step S15 and steps S19 to S22, the compensation value generation unit 44 updates the compensation values CM of only the plurality of pixels PX included in the focused monitoring region FAR among all the pixels PX stored in the storage unit 50 as the compensation value data 51.

As described above, the compensation value generation unit 44 may correct the compensation values (the performance result of the deterioration monitoring) CM for the group of cells (the group of pixels) PXSG included in the focused monitoring region FAR, by using the correction coefficients Vcoef, in a manner that, based on the compensation values CM corresponding to the cells PXS (pixels PX) and stored in the storage unit 50, that is, the compensation values (the performance result of the deterioration monitoring) CM for the cells PXS (pixels PX) included in the margin region MAR (see FIG. 11) among the compensation values (the performance result of the deterioration monitoring) CM generated by the deterioration monitoring control unit 43 become substantially equal to the compensation values CM indicated by the compensation value data 51 stored in the storage unit 50, and then update the compensation values CM corresponding to the group of cells (the group of pixels) PXSG and stored in the storage unit 50.

Note that in step S22, the compensation value generation unit 44 may update the compensation values CM for only the plurality of pixels PX included in the segment region SAR without updating the compensation values CM for the plurality of pixels PX included in the margin region MAR among all the pixels PX stored as the compensation value data 51 in the storage unit 50 when the compensation values CM of only the plurality of pixels PX included in the focused monitoring region FAR are generated by performing the deterioration monitoring on only the plurality of pixels PX included in the focused monitoring region FAR through determination of Yes in step S15 and steps S19 to S22. As described above, since the decrease amounts of the current-voltage characteristics of the pixels PX included in the margin region MAR are within the allowable range, the compensation values CM do not need to be updated.

Next, in step S23, the compensation unit 41 performs the deterioration compensation (that is, the correction) on the input image signal VDb input from the outside by using the compensation values CM indicated by the compensation value data 51 stored in the storage unit 50 to generate the image signal VDa subjected to the deterioration compensation.

Additionally, in step S24, the high-speed monitoring control unit 421 updates the reference values and the predetermined ranges of all the pixels PX indicated by the reference data 52 stored in the storage unit 50 based on the high-speed monitoring current values (high-speed monitoring measurement values) FMoI of all the pixels PX obtained by performing the high-speed monitoring in step S11.

It should be noted that the above-described steps SF and S11 to S24 are examples, and can be appropriately changed. For example, the update of the reference data 52 in step S24 is not limited to after step S23, but may be after the high-speed monitoring in step SF, or before or after any of steps S11 to S23. Further, the processing of steps S15 to S17 may be omitted.

As described above, the display device 1 according to the present embodiment includes the focused monitoring region setting unit 42. The high-speed monitoring control unit 421 in the focused monitoring region setting unit 42 obtains the high-speed monitoring current value (high-speed monitoring measurement value) FMoI indicating the decrease amount of the current-voltage characteristic of each of the plurality of pixels PX by performing the high-speed monitoring to be performed at a higher speed than that of the deterioration monitoring as in step S11 (see FIG. 13), and specifies a plurality of cell groups PXSG whose high-speed monitoring current values (high-speed monitoring measurement values) FMoI are out of the allowable range as a group of cell groups (a group of pixel groups) PXSG (see FIG. 4) on which the deterioration monitoring control unit 43 needs to perform the deterioration monitoring.

As described above, the high-speed monitoring control unit 421 measures the high-speed monitoring current values FMoI by performing the high-speed monitoring on most of the plurality of pixels PX (all the pixels PX in the example described with reference to step S11 and FIG. 2 and FIG. 4) among the plurality of pixels PX provided in the display region 11, and specifies a group of pixel groups on which the deterioration monitoring control unit 43 needs to perform the deterioration monitoring based on the measurement result. For this reason, detection accuracy of the pixels requiring the deterioration compensation is higher than that of a display device in which the deterioration monitoring is performed based on an estimation result according to priorities of whether or not the deterioration compensation is required without performing the measurement for grasping the decrease amount of the current-voltage characteristic. In addition, the high-speed monitoring control unit 421 can specify a group of pixel groups on which the deterioration monitoring control unit 43 needs to perform the deterioration monitoring by performing the high-speed monitoring in which a time period required for the measurement is shorter than the time period required for the deterioration monitoring, which makes it possible to suppress extension of the time period required for the deterioration compensation compared to the case where the deterioration monitoring is performed on all the pixels PX.

Thereafter, as illustrated in step S12 (see FIG. 13), the region setting unit 422 creates the mapping data FD (see FIG. 4) in which the positions of the plurality of cell groups (plurality of pixel groups) PXSG that are specified by the high-speed monitoring control unit 421 and whose high-speed monitoring current values (high-speed monitoring measurement values) FMoI are out of the allowable range are mapped.

In addition, when the number of pixels included in the cell group (pixel group) PXSG in which the high-speed monitoring current values (high-speed monitoring measurement values) FMoI are out of the allowable range exceeds the predetermined number as in step S16 (see FIG. 13) (in the case of NO in step S16), the region setting unit 422 sets all of the plurality of pixels PX provided in the display region 11 as a group of pixels PX to be subjected to the deterioration monitoring.

In this way, when the number of pixels in the focused monitoring region FAR exceeds the predetermined number, the deterioration monitoring of all of the plurality of pixels PX provided in the display region 11 is performed, thereby making it possible to suppress occurrence of a step in level of the compensation values CM between most of the plurality of pixels PX included in the focused monitoring region FAR and a small number of the plurality of pixels PX not included in the focused monitoring region FAR. As a result, visual recognition of a step in level of brightnesses between the focused monitoring region FAR where the deterioration monitoring is performed and the surrounding region where the deterioration monitoring is not performed, after the deterioration compensation, can be suppressed.

In addition, as in step S23, the compensation value generation unit 44 updates the compensation values CM corresponding to the group of cells (group of pixels) PXSG and stored in the storage unit 50 according to the performance result of the deterioration monitoring by the deterioration monitoring control unit 43. Thus, the compensation values CM stored in the storage unit 50 can be updated to the latest compensation values CM every time the deterioration monitoring is performed. In this way, deterioration in display quality of an image can be suppressed.

For example, as in the case of YES in step S15 and steps S18 to S22 (see FIG. 13), when only the deterioration monitoring for the plurality of pixels PX included in the focused monitoring region FAR that is some of all the pixels PX provided in the display region 11 is performed, the compensation value generation unit 44 updates only the compensation values CM of some of the plurality of pixels PX (the plurality of pixels PX on which the deterioration monitoring is performed) stored in the storage unit 50 according to the performance result of the deterioration monitoring for some of the plurality of pixels PX on which the deterioration monitoring is performed. As a result, it is possible to shorten the time required for performing the deterioration monitoring and storing the compensation values CM, compared to the case where the deterioration monitoring for all the plurality of pixels PX provided in the display region 11 is performed and the compensation values CM stored in the storage unit 50 are updated.

Further, in step S11, the group of cell groups (group of pixel groups) PXSG that have been specified by the high-speed monitoring control unit 421 and on which the deterioration monitoring control unit 43 needs to perform the deterioration monitoring includes at least one cell group (pixel group) PXSG including a plurality of continuous cells (a plurality of pixels PX) PXS (FIG. 4 and the like). Then, as in step S14, the region setting unit 422 sets the segment region (region) SAR surrounding at least one cell group (pixel group) PXSG so as to include the at least one cell group PXSG (see FIG. 6), and thereafter, in step S15, the region setting unit 422 sets the margin region MAR so as to surround the segment region SAR, thereby setting the focused monitoring region FAR.

For example, in the examples illustrated in FIG. 6 and FIG. 7, the at least one cell group (pixel group) PXSG includes the first cell group (first pixel group) AR1 and the second cell group (second pixel group) AR2 that are the plurality of cell groups (pixel groups). Each of the first cell group (first pixel group) AR1 and the second cell group (second pixel group) AR2 includes the plurality of continuous cells (pixels PX) PXS. Although the first cell group (first pixel group) AR1 and the second cell group (second pixel group) AR2 are separated from each other by at least one cell (one pixel), since it can be determined that the adjacent distance is short, the region setting unit 422 integrates the first cell group (first pixel group) AR1 and the second cell group (second pixel group) AR2 into one region in which the deterioration monitoring is performed. As a result, the number of regions in which the deterioration monitoring control unit 43 performs the deterioration monitoring can be reduced as compared with a case where a large number of regions are discretely distributed. This can reduce the processing time period of the deterioration monitoring and the load caused by the processing of the deterioration monitoring.

Figure 14:
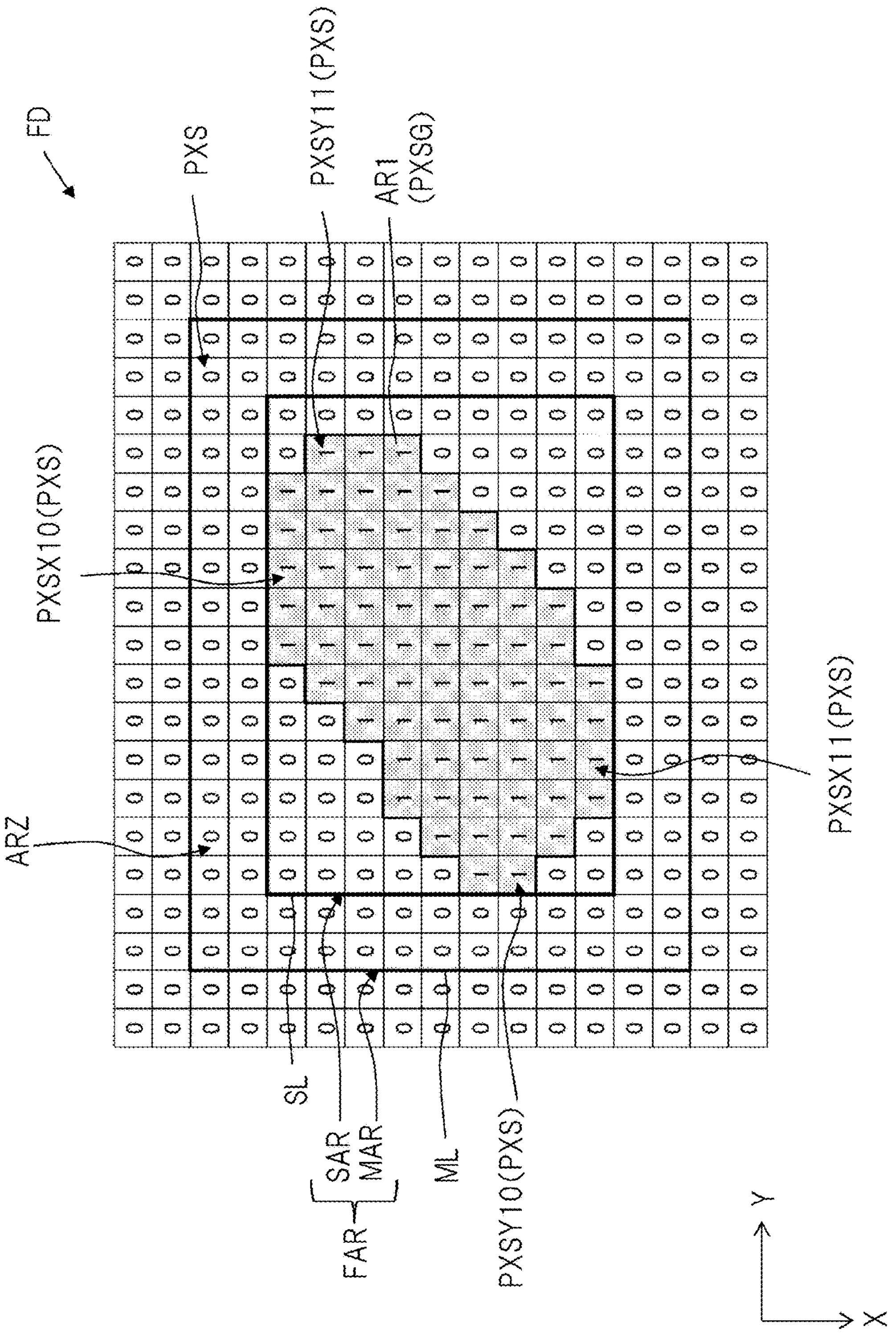
FIG. 14 is a diagram illustrating an example of mapping data including only one cell group in a group of cells on which the deterioration monitoring is to be performed according to the embodiment.

FIG. 14 is a diagram illustrating an example of the mapping data FD including only one cell group in the group of cells PXSG on which the deterioration monitoring is to be performed according to the embodiment. For example, at least one cell group (pixel group) included in the group of cells (group of pixels) PXSG on which the deterioration monitoring is to be performed may be only one cell group instead of a plurality of cell groups.

In the above-described step S14 (FIG. 13), when the first cell group AR1 that is one cell group is present in the group of cells PXSG in the labeled mapping data FD, the region setting unit 422 determines whether or not another cell group adjacent to and close to the first cell group AR1 is present. That is, for example, in a case where the segment line SL for division of the segment region SAR is defined so as to surround the periphery of the first cell group AR1 and to include the first cell group AR1, when it is assumed that the segment line SL having a rectangular shape is defined so as to be adjacent to the outer side of each of the cell PXSX10 having the smallest X-coordinate, the cell PXSX11 having the largest X-coordinate, the cell PXSY10 having the smallest Y-coordinate, and the cell PXSY11 having the largest Y-coordinate among the plurality of cells PXS included in the first cell group AR1, the region setting unit 422 determines whether or not the defined segment line SL passes through another cell group among the plurality of cell groups. When it is determined that the defined segment line SL does not pass through another cell group, the region setting unit 422 further determines whether or not another cell group is included within, for example, two cells PXS (two pixels PX) on each of the outer sides of the X direction and the Y direction that are set as the margin region MAR (see FIG. 7). In the example illustrated in FIG. 14, since another cell group is not included, the region setting unit 422 fixes the assumed segment line SL. That is, the region setting unit 422 sets the segment line SL having the rectangular shape so as to be adjacent to the outer side of each of the cell PXSX10 having the smallest X-coordinate, the cell PXSX11 having the largest X-coordinate, the cell PXSY10 having the smallest Y-coordinate, and the cell PXSY11 having the largest Y-coordinate, and to include the first cell group AR1. As described above, the region setting unit 422 may set the segment region SAR so as to include only one first cell group (one pixel group) AR1 as a group of cell groups (a group of pixel groups) PXSG. Thereafter, the region setting unit 422 sets the margin region MAR in a frame shape around the segment region SAR. As a result, the focused monitoring region FAR including the margin region MAR and the segment region SAR is set.

In addition, as illustrated in step S14 (see FIG. 13), the region setting unit 422 sets the focused monitoring region FAR including the margin region MAR (see FIG. 7) adjacent to the outer sides of the segment region SAR (see FIG. 7) surrounding so as to include at least one cell group PXSG (pixel group). Then, as in steps S19 to S21 (see FIG. 13), the compensation value generation unit 44 may correct the compensation values (the performance result of the deterioration monitoring) CM for the group of cells (the group of pixels) PXSG included in the focused monitoring region FAR, based on the compensation values (the performance result of the deterioration monitoring) CM in cells PXS (pixels PX) included in margin region MAR (see FIG. 11) among the compensation values (the performance result of the deterioration monitoring) CM generated by the deterioration monitoring control unit 43 with the compensation values CM corresponding to the cells PXS (pixels PX) and stored in storage unit 50, and then update the compensation values CM corresponding to the group of cells (group of pixels) PXSG and stored in storage unit 50.

As a result, even when only the deterioration monitoring for the plurality of pixels PX that are included in the focused monitoring region FAR and that are some of all the pixels PX included in the display region 11, is performed, it is possible to suppress occurrence of a step in level of brightnesses between the inside of the focused monitoring region FAR and the outside of the focused monitoring region FAR. As a result, the display device 1 with high display quality of an image can be obtained.

Figure 15:
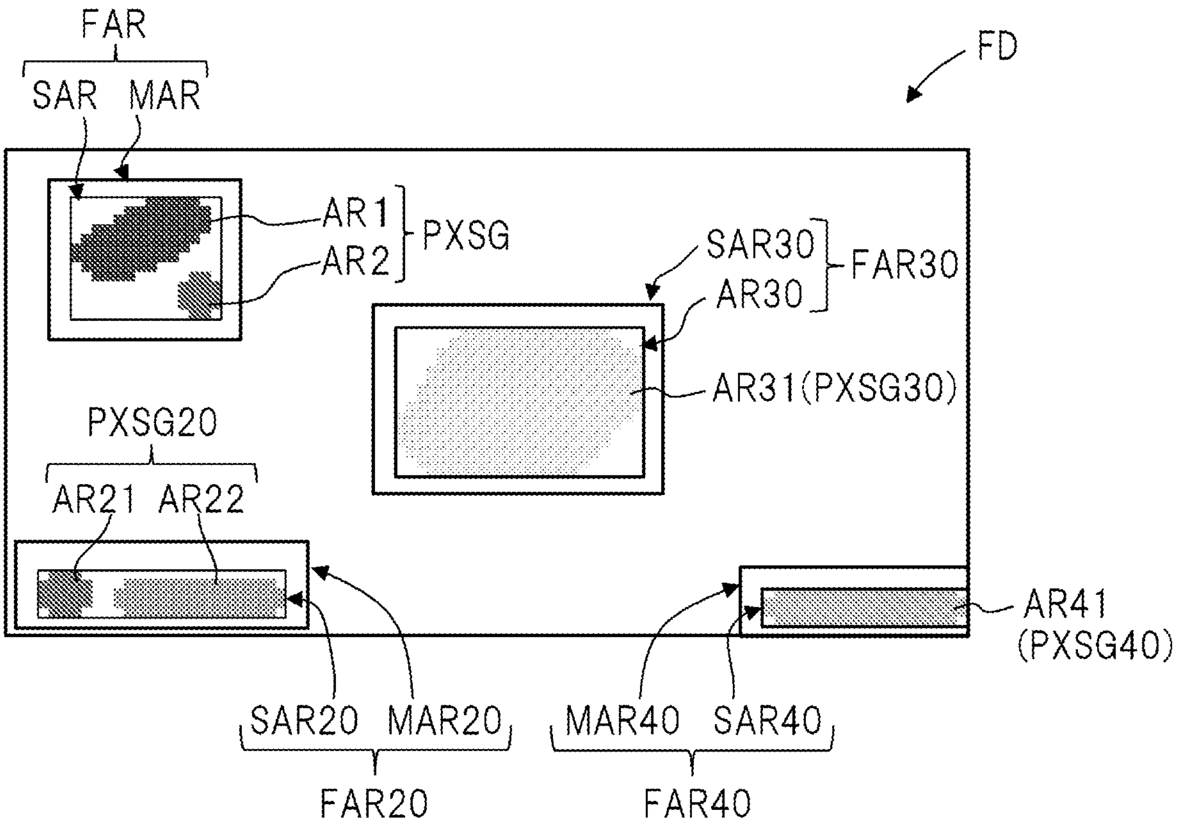
FIG. 15 is a diagram illustrating an example of mapping data including a plurality of focused monitoring regions according to the embodiment.

FIG. 15 is a diagram illustrating an example of the mapping data FD including a plurality of focused monitoring regions FAR, FAR20, FAR30, and FAR40 according to the embodiment. As illustrated in FIG. 15, for example, the region setting unit 422 may set a plurality of focused monitoring regions FAR20, FAR30, and FAR40 separated from each other, in addition to the focused monitoring region FAR, in the mapping data FD.

For example, the focused monitoring region FAR is set at the upper left of the mapping data FD, and includes the segment region SAR and the margin region MAR surrounding the periphery of the segment region SAR. The segment region SAR is provided so as to surround the first cell group AR1 and the second cell group AR2 that are a group of cells PXSG and that are a plurality of cell groups separated from each other. For example, the focused monitoring region FAR20 is set at the lower left in the mapping data FD, and includes a segment region SAR20 and a margin region MAR20 surrounding the periphery of the segment region SAR20. The segment region SAR20 is provided so as to surround a first cell group AR21 and a second cell group AR22 that are a group of cells PXSG20 and that are a plurality of cell groups separated from each other.

For example, the focused monitoring region FAR30 is set at the center of the mapping data FD, and includes a segment region SAR30 and a margin region MAR30 surrounding the segment region SAR30. The segment region SAR30 is provided so as to surround a first cell group AR31 that is a group of cells PXSG30 and that is a single cell group. For example, the focused monitoring region FAR40 is set at the lower right in the mapping data FD, and includes a segment region SAR40 and a margin region MAR40 surrounding the segment region SAR40. The segment region SAR40 is provided so as to surround a first cell group AR41 that is a group of cells PXSG40 and that is a single cell group.

As described above, even when the plurality of focused monitoring regions FAR, FAR20, FAR30, and FAR40 are set, the region setting unit 422 causes the deterioration monitoring control unit 43 to perform the deterioration monitoring on each of the plurality of focused monitoring regions FAR, FAR20, FAR30, and FAR40. In addition, when the plurality of focused monitoring regions FAR, FAR20, FAR30, and FAR40 are set, the region setting unit 422 may assign priorities to the plurality of focused monitoring regions FAR, FAR20, FAR30, and FAR40, and cause the deterioration monitoring control unit 43 to perform the deterioration monitoring on each of the plurality of focused monitoring regions FAR, FAR20, FAR30, and FAR40 in the order of the priorities.

FIG. 16 is a diagram illustrating an example of a priority list PL in which the region setting unit 422 assigns the priorities to the plurality of focused monitoring regions according to the embodiment. For example, when labeling each cell PXS, the region setting unit 422 may obtain information indicating predetermined conditions, which will be described below, together from each cell PXS to include the information in the priority list PL, and may assign scores related to each predetermined condition to determine the priorities.

The predetermined condition may be represented by, for example, any one of the following conditions (1) to (4) or a combination thereof.

(1) The number of pixels (the number of cells PXS) included in each of the focused monitoring regions FAR, FAR20, FAR30, and FAR40.

(2) A maximum value of the high-speed monitoring current values (high-speed monitoring measurement values) FMoI in the plurality of pixels PX included in each of the focused monitoring regions FAR, FAR20, FAR30, and FAR40.

(3) An average value of the high-speed monitoring current values (high-speed monitoring measurement values) FMoI in the plurality of pixels PX included in each of the focused monitoring regions FAR, FAR20, FAR30, and FAR40.

(4) An area of a group of pixels included in each of the focused monitoring regions FAR, FAR20, FAR30, and FAR40, that is, an area of each of groups of cells PXSG, PXSG20, PXSG30, and PXSG40.

Furthermore, at least one of the following conditions (5) or (6) may be added to the predetermined conditions for determining the priorities of the focused monitoring regions FAR, FAR20, FAR30, and FAR40.

(5) The priorities may be raised according to barycentric coordinates of the respective focused monitoring regions FAR, FAR20, FAR30, and FAR40. That is, barycentric coordinates (the center of X-coordinates and Y-coordinates of each region) of each of the focused monitoring regions FAR, FAR20, FAR30, and FAR40 are obtained, and a region closer to the center of a screen is given a higher priority. Alternatively, in a case where a region to be regarded as important is present even when the region is not positioned at the center of the screen, a region closer to the region to be regarded as important is given a higher priority.

(6) The number of cell groups included in each of the focused monitoring regions FAR, FAR20, FAR30, and FAR40. As the focused monitoring region has the larger number of cell groups, the number of regions determined by the high-speed monitoring control unit 421 to be a burn-in region increases, and steps in level between brightnesses of a plurality of burn-in regions and the other regions increase, so that the focused monitoring region having the larger number of cell groups may be given a higher priority.

As described above, when the region setting unit 422 sets the focused monitoring region FAR and at least one other focused monitoring region FAR20, FAR30, or FAR40 different from the focused monitoring region FAR that are the plurality of focused monitoring regions FAR, FAR20, FAR30, and FAR40, the region setting unit 422 sets priorities of the focused monitoring region FAR and the at least one other focused monitoring region FAR20, FAR30, or FAR40 in accordance with the predetermined conditions. Then, the deterioration monitoring control unit 43 may perform the deterioration monitoring of each of the focused monitoring region FAR and the at least one other focused monitoring region FAR20, FAR30, or FAR40 different from the focused monitoring region FAR in the order of the priorities. Then, the compensation value generation unit 44 may update the compensation values CM corresponding to each of the focused monitoring region FAR and the at least one other focused monitoring region FAR20, FAR30, or FAR40 different from the focused monitoring region FAR, the compensation values CM being stored in the storage unit 50 according to the performance result of the deterioration monitoring. As a result, the deterioration monitoring can be performed a larger number of times for the focused monitoring region having the higher priority, and the compensation values CM indicated by the compensation value data 51 stored in the storage unit 50 can be updated a larger number of times. As a result, the deterioration compensation is performed for the focused monitoring region having the higher priority according to a decrease amount of luminous efficiency according to the actual display quality, so that the deterioration in the display quality of an image can be suppressed.

Figure 17:
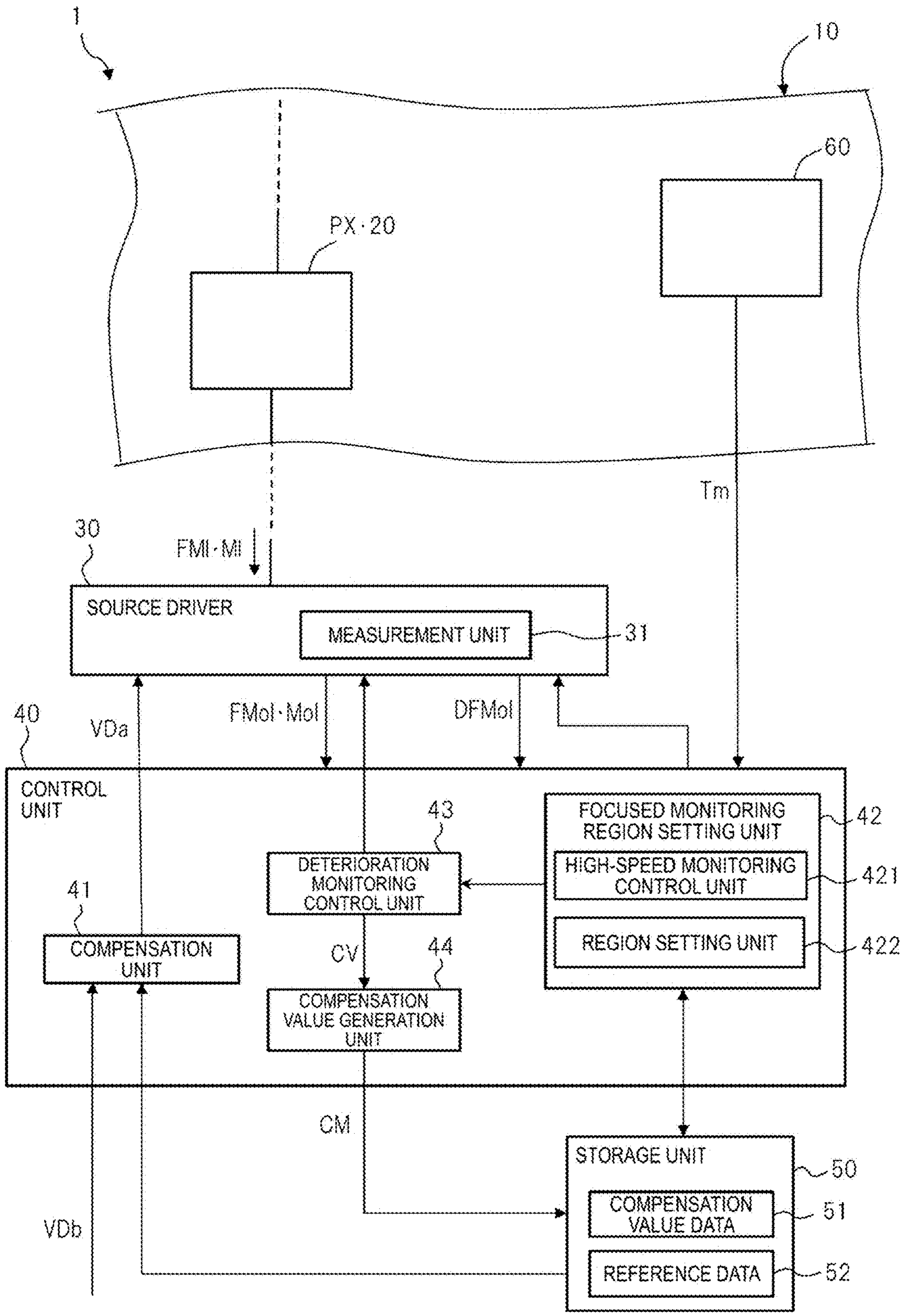
FIG. 17 is a diagram illustrating a schematic configuration of a display device according to a first modified example of the embodiment.

FIG. 17 is a diagram illustrating a schematic configuration of the display device 1 according to a first modified example of the embodiment. As illustrated in FIG. 17, the display panel 10 included in the display device 1 may include a temperature sensor 60.

When the high-speed monitoring current value FMoI is obtained from each pixel circuit 20 in step SF13 in step SF1 in which the high-speed monitoring described with reference to FIG. 3 is performed, the high-speed monitoring control unit 421 then obtains temperature information Tm indicating a temperature of the display panel 10 from the temperature sensor 60 before determining whether or not the pixel circuit 20 in which the decrease amount of the current-voltage characteristic is out of the allowable range is present.

Then, the high-speed monitoring control unit 421 corrects the high-speed monitoring current value FMoI from each pixel circuit 20 so as to become a numerical value corresponding to a temperature when the reference value or the like indicated by the reference data 52 stored in the storage unit 50 is obtained. For example, in a case where the temperature when the reference value or the like indicated by the reference data 52 stored in the storage unit 50 is obtained is 25° C., the high-speed monitoring control unit 421 corrects the high-speed monitoring current value FMoI from each pixel circuit 20 to a numerical value estimated when the temperature is 25° C. based on the temperature information Tm. After correcting the high-speed monitoring current value FMoI according to the temperature indicated by the temperature information Tm obtained from the temperature sensor 60, the high-speed monitoring control unit 421 may proceed to the processing of step SF14 (see FIG. 3).

Since the higher the temperature is, the larger the current value flowing through the pixel circuit 20 is, for example, when the temperature indicated by the temperature information Tm obtained from the temperature sensor 60 is higher than 25° C., the high-speed monitoring control unit 421 corrects the high-speed monitoring current value FMoI obtained from each pixel circuit 20 to become low, such as multiplying the high-speed monitoring current value FMoI obtained from each pixel circuit 20 by 0.75, when the temperature indicated by the temperature information Tm obtained from the temperature sensor 60 is 45° C. On the other hand, when the temperature indicated by the temperature information Tm obtained from the temperature sensor 60 is lower than 25° C., the high-speed monitoring control unit 421 performs correction such that the high-speed monitoring current value FMoI obtained from each pixel circuit 20 becomes high. For example, a relationship of the temperature-current characteristic may be measured in advance, and a conversion value for correcting the current value so as to correspond to 25° C. may be stored as an LUT in the storage unit 50 or another storage unit.

Further, in addition to or instead of the correction of the high-speed monitoring current value FMoI that is the performance result of the high-speed monitoring described above, the display device 1 may correct the deterioration monitoring current value MoI that is the performance result of the deterioration monitoring based on the temperature indicated by the temperature information Tm obtained from the temperature sensor 60.

In this case, for example, when the deterioration monitoring current value MoI is obtained from each pixel circuit 20 in step SM13 in step SM1 in which the deterioration monitoring described with reference to FIG. 8 is performed, the deterioration monitoring control unit 43 obtains the temperature information Tm indicating the temperature of the display panel 10 from the temperature sensor 60 before or after the processing in step SM14.

Then, the deterioration monitoring control unit 43 corrects the deterioration monitoring current value MoI from each pixel circuit 20 so as to become the numerical value corresponding to the temperature when the compensation value CM indicated by the compensation value data 51 stored in the storage unit 50 is obtained. For example, in a case where the temperature when the compensation value CM or the like indicated by the compensation value data 51 stored in the storage unit 50 is obtained is 25° C., the deterioration monitoring control unit 43 corrects the deterioration monitoring current value MoI from each pixel circuit 20 to the numerical value estimated when the temperature is 25° C. based on the temperature information Tm. After correcting the deterioration monitoring current value MoI according to the temperature indicated by the temperature information Tm obtained from the temperature sensor 60, the deterioration monitoring control unit 43 may proceed to, for example, the processing of step SM14 or the processing of step SM15 (see FIG. 8). Also in the case where the performance result of the deterioration monitoring is corrected according to the temperature, for example, the relationship of the temperature-current characteristic may be measured in advance, and a conversion value for correcting the current value so as to correspond to 25° C. may be stored as an LUT in the storage unit 50 or another storage unit, for example.

In this manner, the display device 1 may include the temperature sensor 60 provided in the display panel 10. Then, in the display device 1, at least one of correction of the high-speed monitoring current value (high-speed monitoring measurement value) FMoI by the high-speed monitoring control unit 421 according to the temperature information Tm measured by the temperature sensor 60 or correction of the deterioration monitoring current value (performance result of the deterioration monitoring) MoI by the deterioration monitoring control unit 43 according to the temperature information Tm measured by the temperature sensor 60 may be performed.

Accordingly, it is possible to suppress a measurement error caused by a temperature change of the display panel 10, to accurately set the focused monitoring region FAR, and to accurately perform the deterioration compensation. As a result, the display device 1 capable of displaying an image with higher display quality can be obtained.

Figure 18:
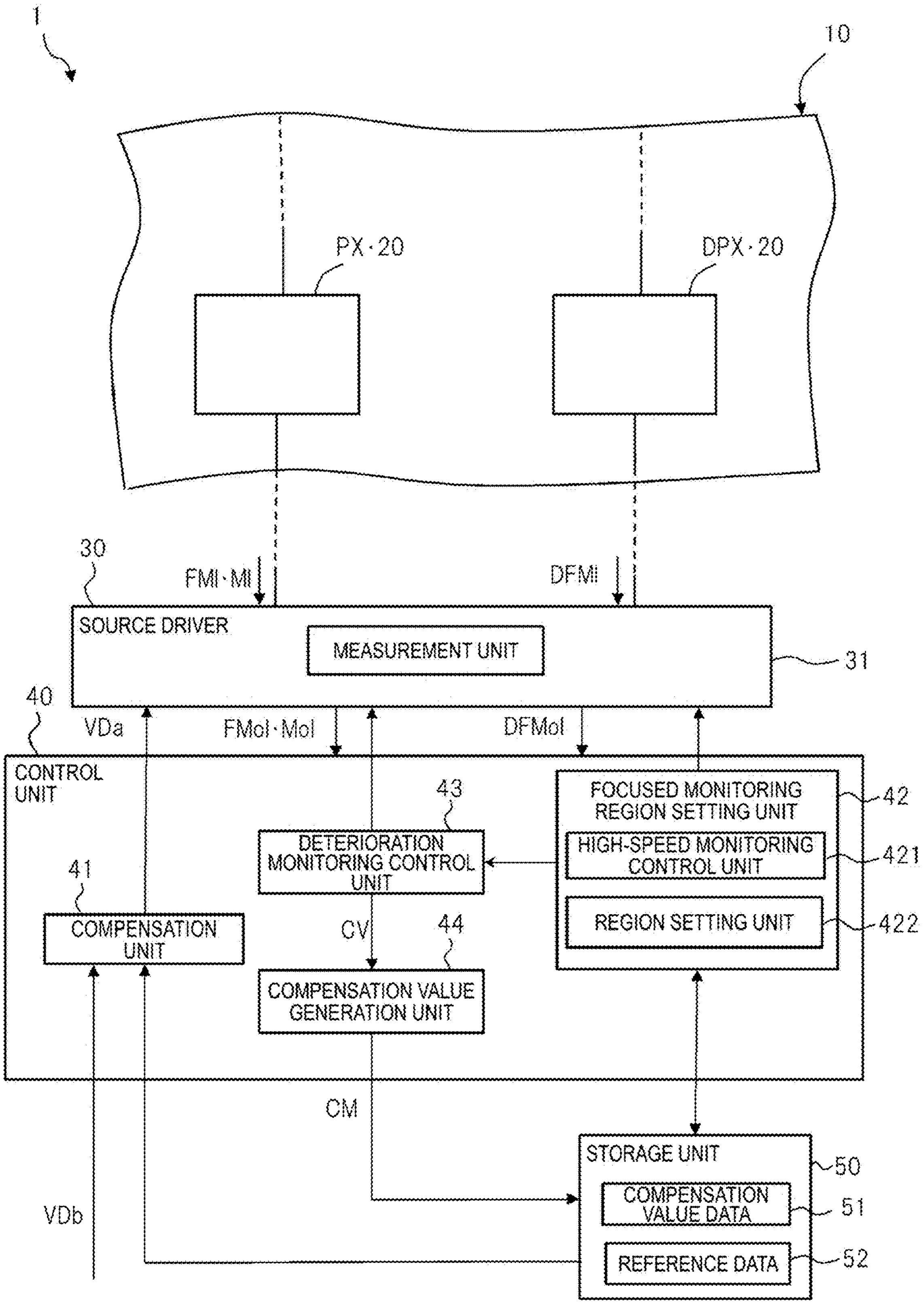
FIG. 18 is a diagram illustrating a schematic configuration of a display device according to a second modified example of the embodiment.

FIG. 18 is a diagram illustrating a schematic configuration of the display device 1 according to a second modified example of the embodiment. As illustrated in FIG. 18, the display panel 10 included in the display device 1 may include at least one dummy pixel DPX. The dummy pixel DPX includes the pixel circuit 20 (see FIG. 2) similarly to the pixel PX. However, the pixel circuit 20 included in the dummy pixel DPX is not turned on. For this reason, the dummy pixel DPX is less deteriorated in the current-voltage characteristic than the pixel PX that is turned on.

The high-speed monitoring control unit 421 may obtain the high-speed monitoring current value FMoI from the dummy pixel DPX in advance and store the high-speed monitoring current value FMoI in the storage unit 50 as the reference data 52. Further, the high-speed monitoring control unit 421 may obtain the high-speed monitoring current value FMoI from each pixel circuit 20 and also obtain the high-speed monitoring current value FMoI from the dummy pixel DPX in step SF13 in step SF1 in which the high-speed monitoring described with reference to FIG. 3 is performed. Then, the high-speed monitoring control unit 421 may then correct the high-speed monitoring current value FMoI obtained from each pixel circuit 20 based on the past high-speed monitoring current value FMoI of the dummy pixel DPX stored in the reference data 52 and the high-speed monitoring current value FMoI measured from the dummy pixel DPX at the corresponding coordinates so as to become a numerical value corresponding to the measurement conditions when the reference value or the like indicated by the reference data 52 stored in the storage unit 50 is obtained before determining whether or not the pixel circuit 20 in which the decrease amount of the current-voltage characteristic is out of the allowable range is present. In addition, for example, when the dummy pixels DPX are provided at the upper and lower ends or the left and right ends of the display panel 10, the correction coefficients to be applied to the respective pixels PX may be obtained, and values obtained by linear interpolation may be used as the correction coefficients to be provided to the pixels PX surrounded by the upper and lower ends and the left and right ends. Thereafter, the high-speed monitoring control unit 421 may proceed to the processing of step SF14 (see FIG. 3).

Then, in step S24 described with reference to FIG. 13, the high-speed monitoring control unit 421 may update the reference values and the predetermined ranges of all the pixels PX indicated by the reference data 52 stored in the storage unit 50 based on the high-speed monitoring current value FMoI obtained from the dummy pixel DPX instead of or in addition to the high-speed monitoring current values FMoI obtained from the pixels PX. For example, the past high-speed monitoring current value FMoI obtained from the dummy pixel DPX may also be stored in the reference data 52. Further, the correction coefficients to be applied to all the pixels PX may be obtained based on the past high-speed monitoring current value FMoI of the dummy pixel DPX stored in the reference data 52 and the high-speed monitoring current value FMoI measured from the dummy pixel DPX at the corresponding coordinates. For example, when the dummy pixels DPX are provided at the upper and lower ends or the left and right ends of the display panel 10, the correction coefficient to be applied to each pixel PX may be obtained, and values obtained by linear interpolation may be used as the correction coefficients to be provided to the pixels PX surrounded by the upper and lower ends and the left and right ends.

Further, in addition to or instead of the correction of the reference data 52 by the high-speed monitoring current value FMoI obtained from the dummy pixel DPX described above, the display device 1 may obtain the deterioration monitoring current value MoI from the dummy pixel DPX described above and generate the compensation coefficient by using the deterioration monitoring current value MoI obtained from the dummy pixel DPX.

In this case, for example, the deterioration monitoring control unit 43 may obtain the deterioration monitoring current value MoI from each pixel circuit 20 and also obtain the deterioration monitoring current value MoI from the dummy pixel DPX in step SM13 in step SM1 of performing the deterioration monitoring described with reference to FIG. 8. Then, in step S20 described with reference to FIG. 13, the compensation value generation unit 44 also uses the deterioration monitoring current value MoI obtained from the dummy pixel DPX to generate the correction coefficient Vcoef. Thereafter, the compensation value generation unit 44 proceeds to the processing of step S22 (see FIG. 13). In other words, the compensation value generation unit 44 generates the compensation value CM by using the deterioration monitoring current value MoI obtained from the dummy pixel DPX (step S12 in FIG. 13), and updates the compensation value CM indicated by the compensation value data 51 stored in the storage unit 50 (step S22 in FIG. 13).

As described above, in the display device 1, at least one dummy pixel DPX may be provided in the display panel 10. Then, in the display device 1, at least one of the correction of the high-speed monitoring current value (high-speed monitoring measurement value) FMoI obtained from the pixel PX by the high-speed monitoring control unit 421 according to the high-speed monitoring current value (high-speed monitoring measurement value) FMoI obtained from the dummy pixel DPX or the update of the compensation value CM indicated by the compensation value data 51 stored in the storage unit 50 by the compensation value generation unit 44 according to the deterioration monitoring current value (performance result of the deterioration monitoring) MoI obtained from the dummy pixel DPX may be performed.

Accordingly, it is possible to suppress a measurement error caused by the temperature change of the display panel 10, to accurately set the focused monitoring region FAR, and to accurately perform the deterioration compensation. As a result, the display device 1 capable of displaying an image with higher display quality can be obtained.

Figure 19:
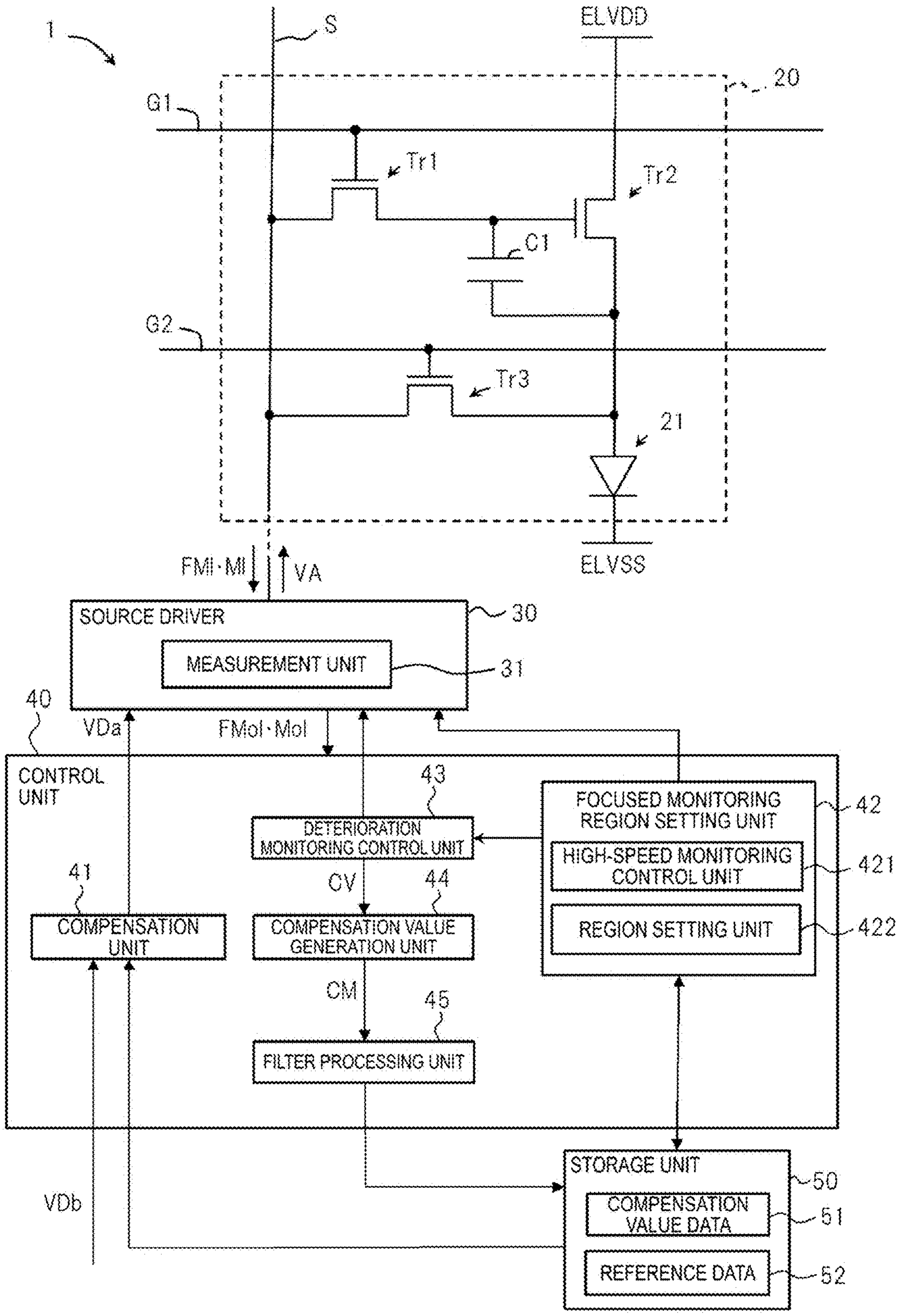
FIG. 19 is a diagram illustrating a schematic configuration of a pixel circuit, a source driver, a control unit, and a storage unit in a display device according to a third modified example of the embodiment.

FIG. 19 is a diagram illustrating a schematic configuration of the pixel circuit 20, the source driver 30, the control unit 40, and the storage unit 50 in the display device 1 of a third modified example according to the embodiment. The control unit 40 may further include a filter processing unit 45. After the compensation value generation unit 44 obtains the compensation values CM after the correction by using the correction coefficients Vcoef and creates the mapping data MD (see FIG. 11) including the plurality of cells PXS to which the compensation values CM after the correction are added, the filter processing unit 45 performs filter processing on the mapping data MD.

Figure 20:
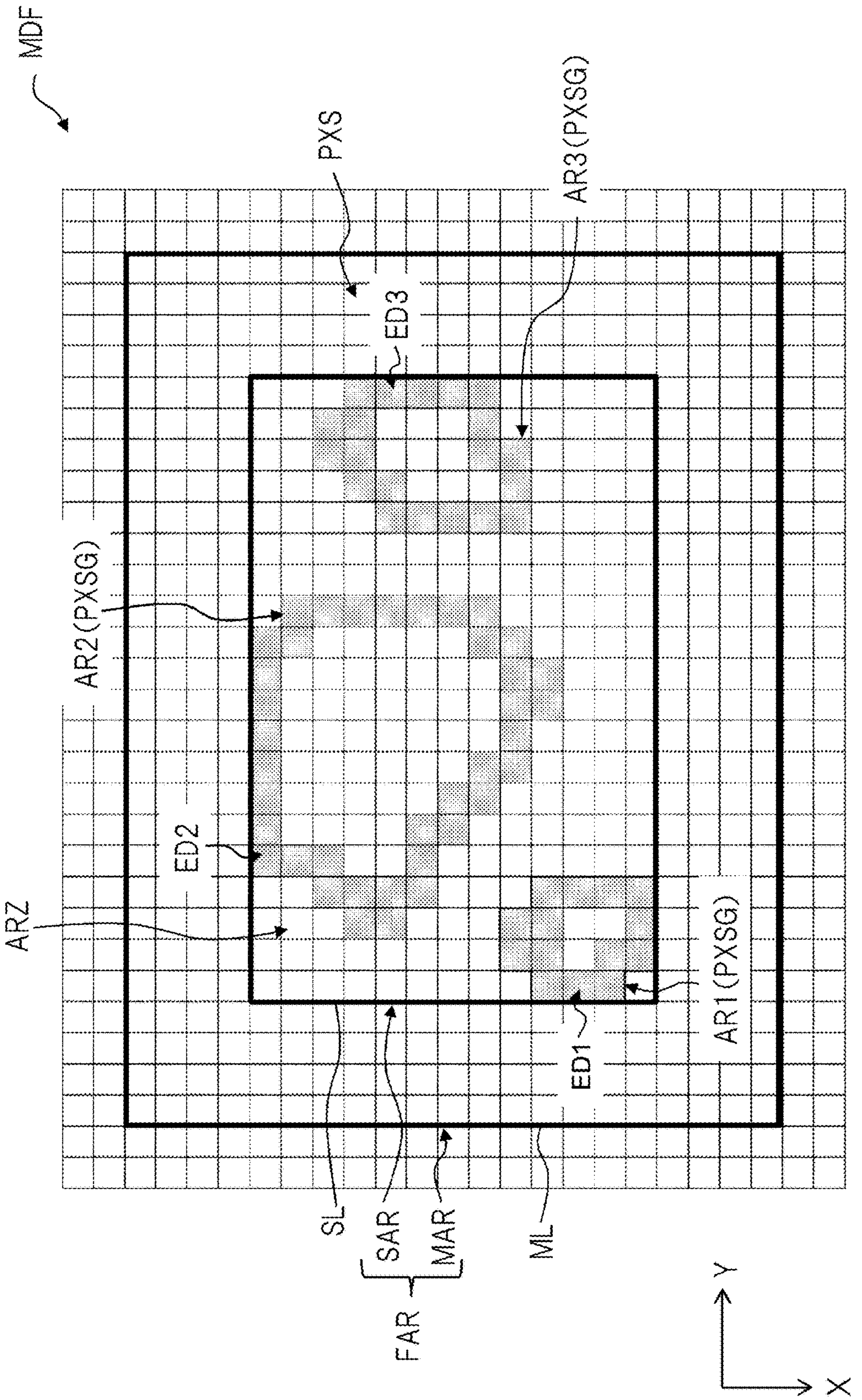
FIG. 20 is a diagram illustrating an example of mapping data to be used for filter processing according to the third modified example of the embodiment.
Figure 21:
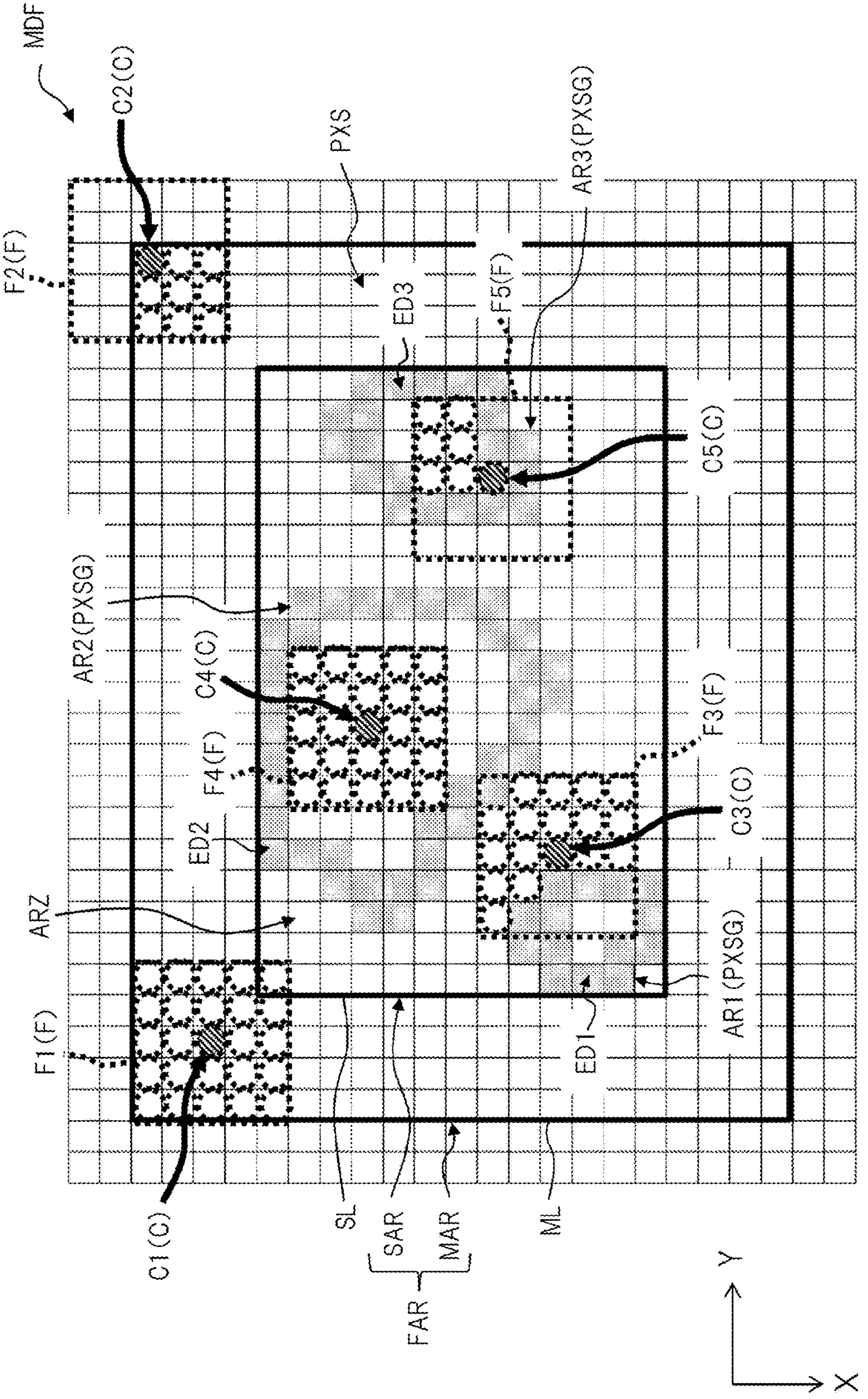
FIG. 21 is a diagram for describing a state in which a filter processing unit performs the filter processing according to the third modified example of the embodiment.

FIG. 20 is a diagram illustrating an example of mapping data MDF to be used for the filter processing according to the third modified example of the embodiment. Note that the mapping data MD illustrated in FIG. 21 is illustrated as an example in which the number of cells in the margin region MAR and the number and the shape of cell groups included in the group of cells PXSG are different from those of the mapping data MD illustrated in FIG. 11. In the mapping data MDF illustrated in FIG. 20, the number of cells of the margin region MAR is four cells in each of the positive and negative X directions and the positive and negative Y directions (eight cells in the X direction and eight cells in the Y direction in total). In addition, the segment region SAR is divided so as to include the first cell group AR1, the second cell group AR2, and the third cell group AR3 that are a plurality of cell groups separated from each other as the group of cells PXSG.

The filter processing unit 45 uses, for example, the mapping data MD (see FIG. 11) generated by the compensation value generation unit 44 to generate the mapping data MDF to be used for the filter processing illustrated in FIG. 20. The filter processing unit 45 detects respective edges of the plurality of cell groups that are separated from each other and that are included in the group of cells PXSG and sets edge cells. For example, the filter processing unit 45 sets edge cells ED1 that are a cell group surrounding the whole periphery of an end portion in the first cell group AR1, sets edge cells ED2 that are a cell group surrounding the whole periphery of an end portion in the second cell group AR2, and sets edge cells ED3 that are a cell group surrounding the whole periphery of an end portion in the third cell group AR3.

For example, when the following determination criteria (i) and (ii) are satisfied, the filter processing unit 45 may determine that a target cell PXS is an edge cell.

- (i) The target cell PXS is included in a burn-in region (a plurality of cell groups that are separated from each other and that are included in the group of cells PXSG). That is, for example, a numerical value other than the labeling numerical value "0" is added to the target cell PXS by the region setting unit 422.
- (ii) A cell PXS that is not in a burn-in region (the plurality of cell groups that are separated from each other and that are included in the group of cells PXSG), that is, a cell to which the labeling numerical value "0" is added, is present in eight cells around the target cell PXS.

Note that the filter processing unit 45 regards each cell PXS other than the edge cells ED1, the edge cells ED2, and the edge cells ED3 among the cells PXS included in the focused monitoring region FAR as a flat region to be subjected to the filter processing even when the cell PXS is a cell PXS inside each of the edge cells ED1, the edge cells ED2, and the edge cells ED3 (inside the burn-in region) or a cell PXS outside each of the edge cells ED1, the edge cells ED2, and the edge cells ED3 (outside the burn-in region).

FIG. 21 is a diagram illustrating a state in which the filter processing unit 45 performs the filter processing according to the third modified example of the embodiment. As illustrated in FIG. 21, after setting edge cells in each cell group, the filter processing unit 45 performs the filter processing on each cell PXS included in the flat region in the focused monitoring region FAR. The filter processing unit 45 performs the filter processing on a target cell (target pixel) by using a filter F including a cell array (pixel arrangement) of m rows and n columns (m and n are integers equal to or larger than 2) including the target cell (target pixel) on which the filter processing is performed. The filter processing to be performed by the filter processing unit 45 is, for example, low-pass filter processing. Note that although not illustrated in FIG. 21, it is assumed that the compensation value CM added to each cell PXS by the region setting unit 422 is added to each cell PXS included in the cell array of m rows and n columns to be used by the filter processing unit 45.

In the example illustrated in FIG. 21, the filter processing unit 45 uses the filter F constituted by a 5×5 cell array. The center cell of the cell array (pixel arrangement) included in the filter F represents a target cell (target pixel) C. When performing the filter processing on the target cell C, the filter processing unit 45 performs a convolution operation by using the compensation values CM of the cells PXS around the target cell C in the filter F. At this time, when the edge cells ED1 to ED3 are included in the filter F, the filter processing of the target cell C may be performed by using the compensation value CM added to each cell of the cell array included in the region in which the target cell C is positioned and that is divided by any one type of edge cells ED1 to ED3 in the filter F. An example of a method of the filter processing to be performed by the filter processing unit 45 will be described.

For example, like the filter F1, when the cell array of the filter includes the plurality of cells PXS (only the plurality of cells PXS to which the labeling numerical value "0" is added) included only in at least one of the margin region MAR or the adjacent cell group ARZ in the segment region SAR and when the edge cells ED1 to ED3 are not included in the filter F1, the filter processing of the target cell C1 is performed by using the compensation values CM of a cell array including 25 cells (cell array including cells with circles indicated by broken lines in FIG. 21) included in the filter F1.

For example, like the filter F2, when a part of the cell array is positioned outside the focused monitoring region FAR and the remaining part of the cell array is positioned in the margin region MAR, the filter processing of the target cell C2 is performed by using the respective compensation values CM of the cell array (a cell array including nine cells that include the target cell C2 and that are indicated by circles with broken lines in FIG. 21) positioned in the margin region MAR of the focused monitoring region FAR among the cell array of the filter F2.

For example, like the filter F3, when the edge cells ED1 and ED2 are present in the filter F3 and the target cell C3 in the filter F3 is positioned in the adjacent cell group ARZ outside the first cell group AR1 and the second cell group that are in burn-in regions, the target cell C3 is filtered by using the compensation values CM of the cell array (a cell array including 17 cells that include the target cell C3 and that are indicated by circles with broken lines in FIG. 21) positioned in the adjacent cell group ARZ that is divided by the edge cells ED1 and ED2 and that is positioned outside the edge cells ED1 and ED2, the cell array being positioned in a region including the target cell C3, among the cell array included in filter F3.

For example, like the filter F4, when all of the cell array in the filter F4 is in a burn-in region and the filter F4 does not include the edge cells ED2, the filter processing of the target cell C4 is performed by using the compensation values CM of the cell array (a cell array including 25 cells with circles indicated by broken lines in FIG. 21) in the filter F4.

For example, like the filter F5, when the edge cells ED3 are included in the cell array in the filter F5 and the target cell C5 is included in the third cell group AR3 that is in the burn-in region, the target cell C5 is filtered by using the compensation values CM of the cell array (a cell array including seven cells that include the target cell C5 and that are indicated by circles with broken lines in FIG. 21) positioned in the third cell group AR3 being in the burn-in region that is positioned on the inner side of the edge cells ED3 and that is divided by the edge cells ED3, and positioned in a region including the target cell C5, among the cell array included in the filter F5.

In this way, the filter processing unit 45 may perform correction by performing the filter processing on the compensation value CM added to each cell PXS and update the compensation value CM indicated by the compensation value data 51 stored in the storage unit 50 with the compensation value CM after the filter processing.

As described above, the filter processing unit 45 in the display device 1 may further perform low-pass filter processing on the compensation values CM (the performance result of the deterioration monitoring) obtained by the compensation value generation unit 44 and update the compensation values CM corresponding to the group of cells (the group of pixels) PXSG and stored in the storage unit 50 with the compensation values CM (the performance result of the deterioration monitoring) after the low-pass filter processing. Here, when the high-speed monitoring or the deterioration monitoring is performed, noise may be included in the measurement value. Due to this noise, a minute fluctuation occurs in the compensation voltage value, and the noise may be visually recognized also in the display image. On the other hand, reducing the influence of noise by the low-pass filter processing in the filter processing unit 45 makes it possible to obtain the display device 1 having high display quality of an image.

For example, the filter processing unit 45 performs the low-pass filter processing on the target cell (target pixel) C based on the compensation value (performance result of the deterioration monitoring) CM corresponding to each cell of the cell array (pixel arrangement) of m rows and n columns (m and n are integers equal to or greater than 2) including the target cell (target pixel) C. Then, when the edge cells (edges) ED1 to ED3 of the group of cells (the group of pixels) PXSG are included in the cell array (pixel arrangement) of the filter F, the filter processing unit 45 may perform the low-pass filter processing on the target cell C (target pixel) based on the compensation value (performance result of the deterioration monitoring) CM corresponding to each cell of only the partial cell array (pixel arrangement) divided by the edge cells ED1 to ED3 (edges) including the target cell (target pixel) C in the cell array (pixel arrangement). Thus, when the edge cells (edges) ED1 to ED3 are present in the filter F, performing the low-pass filter processing on the target cell C for each of the regions divided by the edge cells (edges) ED1 to ED3 in the filter F makes it possible to suppress the influence of noise on the measurement value for each of the regions divided by the edge cells (edges) ED1 to ED3. As a result, it is possible to obtain the display device 1 having high display quality of an image.

Note that the storage unit 50 is a computer-readable storage medium and may non-temporarily store a display program installed from a storage medium external to the display device 1 or a server capable of communicating with the display device 1. The display program causes the control unit 40 to function as the compensation unit 41, the high-speed monitoring control unit 421, the region setting unit 422, the deterioration monitoring control unit 43, the compensation value generation unit 44, and the filter processing unit 45. The control unit 40 includes a computer as a hardware configuration. The computer may include a processor that causes the control unit 40 to function as the compensation unit 41, the high-speed monitoring control unit 421, the region setting unit 422, the deterioration monitoring control unit 43, the compensation value generation unit 44, and the filter processing unit 45 by executing the display program. The type of processor does not matter as long as it can achieve functions by executing the display program. As the processor, it is possible to use various types of processors such as a Central Processing Unit (CPU), a Graphics Processing Unit (GPU), a Digital Signal Processor (DSP), and an Application Specific Integrated Circuit (ASIC). The processor may include a peripheral circuit device in addition to the CPU, GPU, DSP, or the like. The peripheral circuit device may be an Integrated Circuit (IC), or may include a resistor, a capacitor, and the like.

Note that the respective components described in the above-described embodiment and the modified examples may be appropriately combined in a range in which a contradiction does not arise.

The invention claimed is:

1. A display device comprising:

a display panel including a plurality of pixels;

a focused monitoring region setting unit configured to set a focused monitoring region including a group of pixels to be subjected to deterioration monitoring, the deterioration monitoring being configured to measure a decrease amount of a current-voltage characteristic, among the plurality of pixels; and a deterioration monitoring control unit configured to perform the deterioration monitoring on the group of pixels included in the focused monitoring region, wherein the focused monitoring region setting unit performs high-speed monitoring to be performed at a higher speed than a speed of the deterioration monitoring, thus obtains a high-speed monitoring measurement value indicating the decrease amount of the current-voltage characteristic of each of the plurality of pixels, and sets a pixel group having the high-speed monitoring measurement value out of an allowable range as the group of pixels to be subjected to the deterioration monitoring, wherein in a case where the number of pixels included in the pixel group having the high-speed monitoring measurement value out of the allowable range exceeds a predetermined number, the focused monitoring region setting unit sets all of the plurality of pixels as the group of pixels to be subjected to the deterioration monitoring.

2. The display device according to claim 1, further comprising:

a storage unit configured to store a compensation value configured to be used for deterioration compensation of each of the plurality of pixels; and a compensation value generation unit configured to update the compensation value corresponding to the group of pixels according to a performance result of the deterioration monitoring by the deterioration monitoring control unit, the compensation value being stored in the storage unit.

3. The display device according to claim 2, further comprising:

a temperature sensor provided in the display panel, wherein at least one of correction of the high-speed monitoring measurement value by the focused monitoring region setting unit according to temperature information measured by the temperature sensor or correction of a performance result of the deterioration monitoring by the deterioration monitoring control unit according to the temperature information measured by the temperature sensor is performed.

4. The display device according to claim 2, wherein the display panel includes a dummy pixel, and at least one of correction of the high-speed monitoring measurement value obtained from the pixel of the plurality of pixels by the focused monitoring region setting unit according to the high-speed monitoring measurement value obtained from the dummy pixel or update of the compensation value stored in the storage unit by the compensation value generation unit according to the performance result of the deterioration monitoring obtained from the dummy pixel is performed.

5. The display device according to claim 2, wherein the group of pixels includes at least one pixel group including a plurality of continuous pixels, and the focused monitoring region setting unit sets, as the focused monitoring region, a region including and surrounding the at least one pixel group.

6. The display device according to claim 5, wherein at least one pixel group includes a first pixel group including a plurality of continuous pixels, and a second pixel group including a plurality of continuous pixels, the second pixel group being discontinuous with the first pixel group, and the focused monitoring region setting unit sets, as the focused monitoring region, a region including and surrounding the first pixel group and the second pixel group.

7. The display device according to claim 2, further comprising:

a filter processing unit, wherein the filter processing unit further performs low-pass filter processing on the performance result of the deterioration monitoring obtained by the compensation value generation unit, and updates the compensation value corresponding to the group of pixels according to the performance result of the deterioration monitoring after the low-pass filter processing, the compensation value being stored in the storage unit.

8. The display device according to claim 5, wherein the focused monitoring region setting unit sets the focused monitoring region including a margin region adjacent to an outer side of the region including and surrounding the at least one pixel group, and the compensation value generation unit corrects the performance result of the deterioration monitoring in the group of pixels included in the focused monitoring region in a manner that a performance result of the deterioration monitoring of a pixel included in the margin region, of the performance result of the deterioration monitoring by the deterioration monitoring control unit, becomes the same value as the compensation value corresponding to the pixel and stored in the storage unit, and then updates the compensation value corresponding to the group of pixels and stored in the storage unit.

9. The display device according to claim 7, wherein the filter processing unit performs the low-pass filter processing on a target pixel based on the performance result of the deterioration monitoring corresponding to each pixel of a pixel arrangement including m rows and n columns, m and n being integers equal to or larger than 2, the pixel arrangement including the target pixel, and in a case where an edge of the group of pixels is included in the pixel arrangement, the filter processing unit performs the low-pass filter processing on the target pixel based on the performance result of the deterioration monitoring corresponding to each of only partial pixels of pixel arrangement divided by the edge including the target pixel in the pixel arrangement.

10. The display device according to claim 2, wherein in a case where the focused monitoring region setting unit sets at least one other focused monitoring region different from the focused monitoring region, the focused monitoring region setting unit sets priorities of the focused monitoring region and the at least one other focused monitoring region according to a predetermined condition, the deterioration monitoring control unit performs the deterioration monitoring of each of the focused monitoring region and the at least one other focused monitoring region in an order of the priorities, and the compensation value generation unit updates the compensation value corresponding to each of the focused monitoring region and the at least one other focused monitoring region according to the performance result of the deterioration monitoring, the compensation value being stored in the storage unit.

11. The display device according to claim 10, wherein the predetermined condition is at least one of: the number of pixels included in each of the focused monitoring region and the at least one other focused monitoring region, a maximum value of the high-speed monitoring measurement values of the plurality of pixels included in each of the focused monitoring region and the at least one other focused monitoring region, an average value of the high-speed monitoring measurement values of the plurality of pixels included in each of the focused monitoring region and the at least one other focused monitoring region, or an area of the group of pixels included in each of the focused monitoring region and the at least one other focused monitoring region.

12. The display device according to claim 2, wherein the storage unit stores reference data configured to be used for determination whether or not the high-speed monitoring measurement value is out of the allowable range, and the focused monitoring region setting unit updates the reference data stored in the storage unit based on the high-speed monitoring measurement value obtained by performing the high-speed monitoring.

* * * * *